United States Patent [19]

Ishikawa et al.

[11] Patent Number: 4,783,674
[45] Date of Patent: Nov. 8, 1988

[54] PHOTOGRAPHIC CAMERA WITH BUILT-IN E2PROM

[75] Inventors: Norio Ishikawa, Osaka; Masaaki Nakai, Kawachinagano; Manabu Inoue, Kobe; Toshihiko Ishimura, Habikino; Hiroshi Ootsuka; Akihiko Fujino, both of Sakai, all of Japan

[73] Assignee: Minolta Camera Kabushiki Kaisha, Osaka, Japan

[21] Appl. No.: 106,774

[22] Filed: Oct. 13, 1987

[30] Foreign Application Priority Data

Oct. 13, 1986 [JP] Japan ............................ 61-242806
Oct. 13, 1986 [JP] Japan ............................ 61-242807

[51] Int. Cl.$^4$ ............................................ G03B 17/00
[52] U.S. Cl. .................................................. 354/289.1
[58] Field of Search ............ 354/410, 412, 484, 289.1, 354/289.12

[56] References Cited

U.S. PATENT DOCUMENTS

| | | | |
|---|---|---|---|
| 4,247,189 | 1/1981 | Date et al. | 354/289.1 X |
| 4,593,983 | 6/1986 | Launie et al. | 354/289.1 |
| 4,621,914 | 11/1986 | Taniguchi et al. | 354/484 X |
| 4,645,326 | 2/1987 | Kiuchi et al. | 354/484 |
| 4,662,736 | 5/1987 | Taniguchi et al. | 354/484 X |
| 4,728,978 | 3/1988 | Inoue et al. | 354/289.1 |
| 4,733,265 | 3/1988 | Haraguchi et al. | 354/484 |
| 4,737,814 | 4/1988 | Nakajima | 354/410 X |

FOREIGN PATENT DOCUMENTS 60-61731  4/1985  Japan .
60-74300  5/1985  Japan .
60-103592  6/1985  Japan .

Primary Examiner—W. B. Perkey
Attorney, Agent, or Firm—Burns, Doane, Swecker & Mathis

[57] ABSTRACT

A data rewriting apparatus for a photographic camera, which comprises a film speed reading unit for automatically reading the film speed recorded on a container of a film in use; a first memory including RAM for the storage of the film speed; a second memory including E$^2$PROM for the storage of the film speed; a rewriting unit for rewriting a value stored in the first memory to a value stored in the second memory; a comparator for comparing the value stored in the second memory with that stored in the first memory; and a rewrite control unit for inhibiting the rewriting of the second rewriting unit when the comparator indicates that the value stored in the second memory is identical with that stored in the first memory.

4 Claims, 19 Drawing Sheets

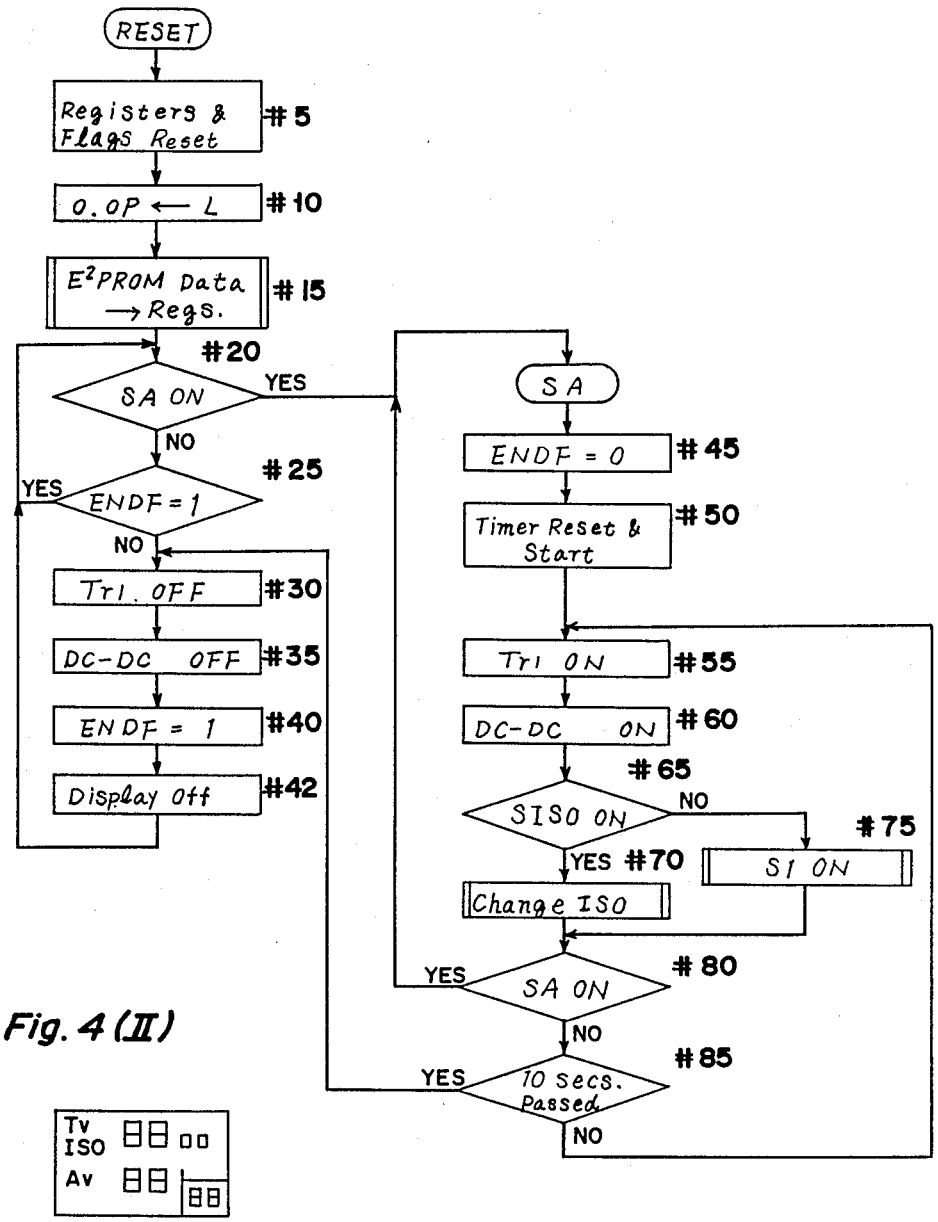

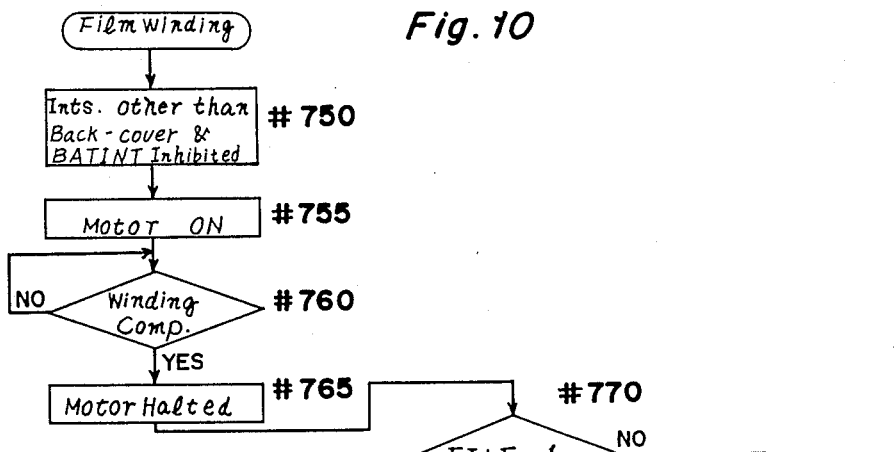
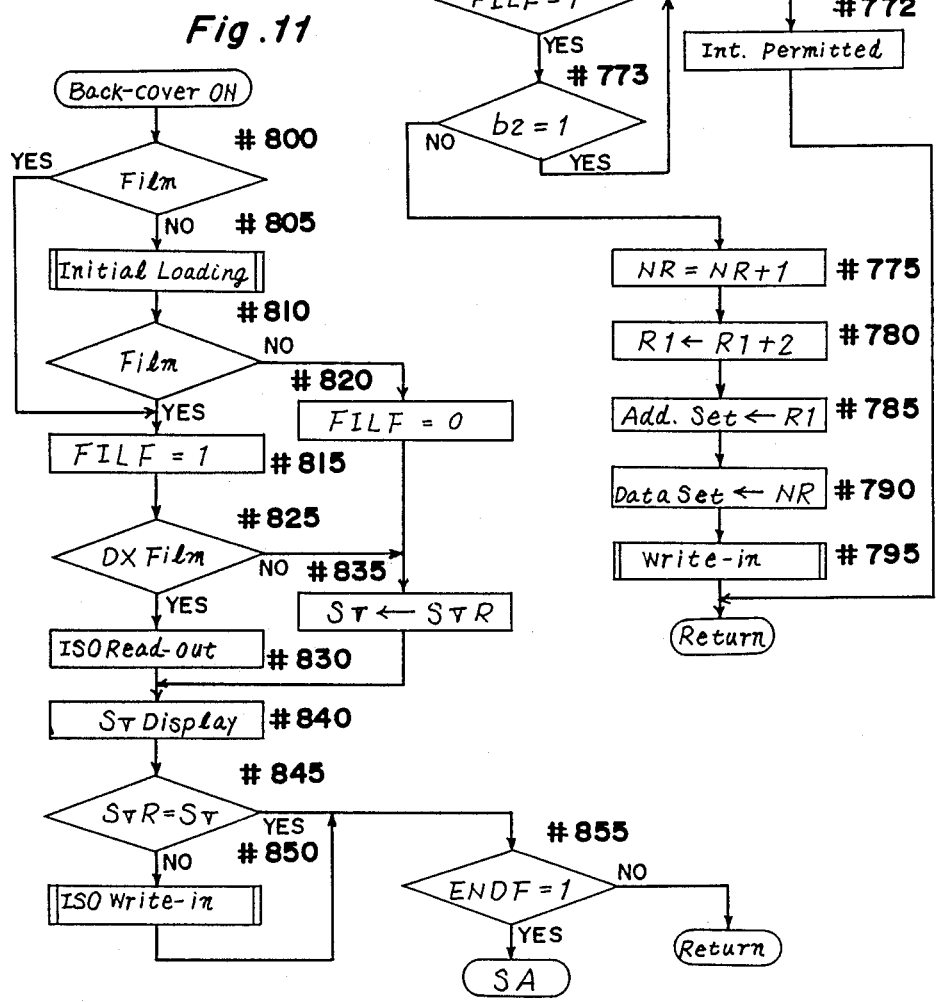
Fig. 10
Fig. 11

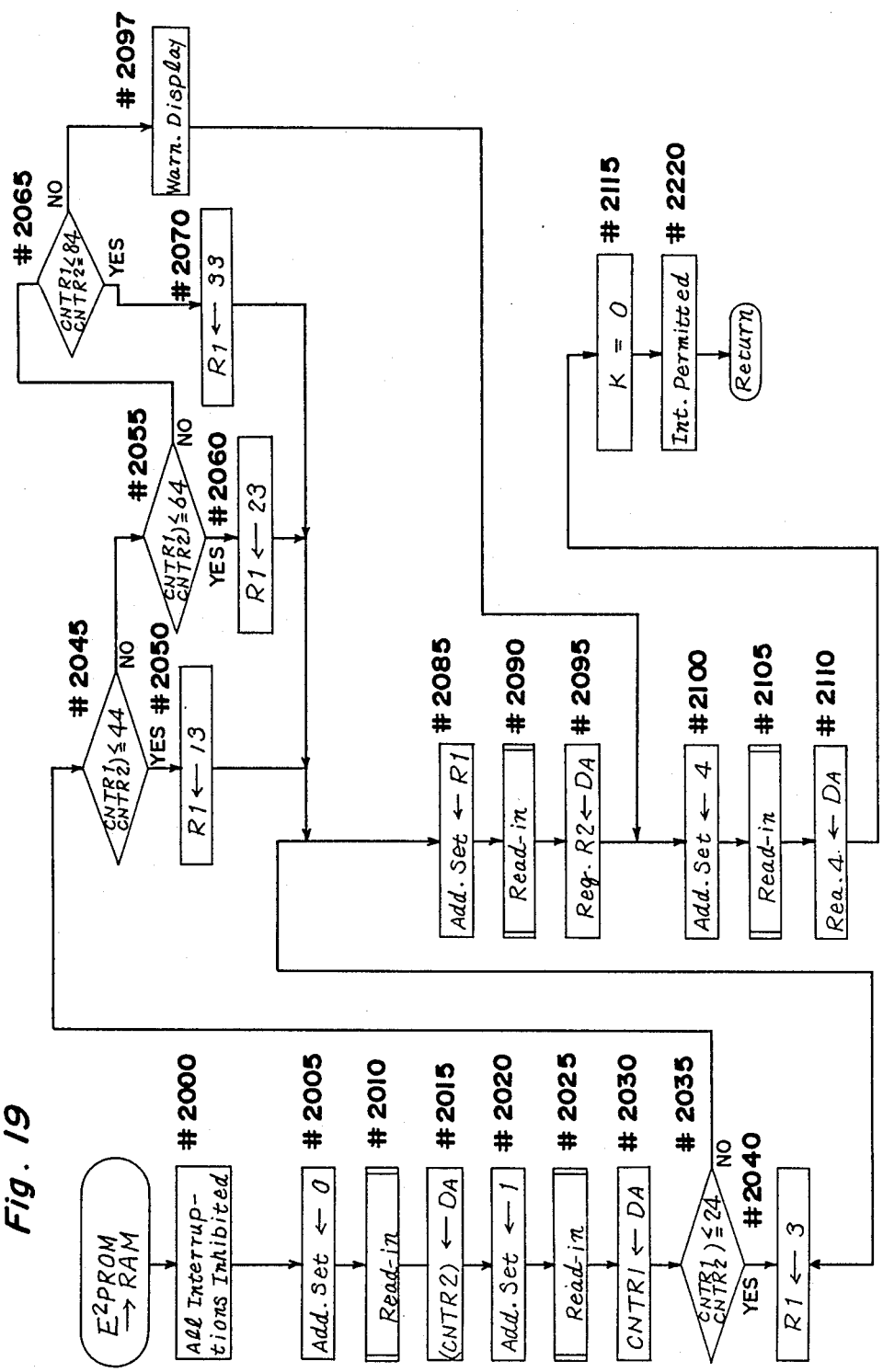

PHOTOGRAPHIC CAMERA WITH BUILT-IN E2PROM

BACKGROUND OF THE INVENTION

1. (Field of the Invention)

The present invention generally relates to a computer-controlled photographic camera and, more particularly, to the photographic camera having built therein an electrically erasable and programmable read only memory (E$^2$PROM) capable of loading data associated with functions of the photographic camera.

2. (Description of the Prior Art)

A variety of photographic cameras are now available on the market, which make use of a microcomputer for the control of focus adjustment and exposure control. In such photographic cameras, photographic information associated with the actual photo-taking is used to be stored in a random access memory (RAM) in the microcomputer. This photographic information once stored is lost when the microcomputer is powered off, and therefore, some information, such as, for example, the cumulative or total number of shutter releases cannot be stored.

The use of a back-up power source for the random access memory makes it possible for the particular information to be stored with no substantial fear of being lost. However, the use of the back-up power source requires a space in the camera for the installation thereof, eventually making the camera relatively bulky in size and high in manufacturing cost.

The erasable and rewriteable E$^2$PROM does not require the use of any back-up power source and should therefore supersede the random access memory. However, the E$^2$PROM being available on the market has such a problem that the reliable total operating number thereof is limited by the deterioration of the erasing and write-in operations, the reliable total operating number being less than the total shutter release number of the camera. Therefore, it is difficult to adopt the E$^2$PROM into the camera and to control the E$^2$PROM.

A camera wherein the E$^2$PROM is built therein is disclosed in, for example, Japanese Laid-open Patent Publication No. 60-61731, published in 1985. The camera according to this prior art publication is so designed and so constructed that photographic information including, for example, the number of exposures available for a particular film, and data descriptive of the status of a film wind-up switch can be transferred from RAM onto E$^2$PROM at the time of removal or replacement of a power source battery or when the power source battery is going to run down, but the information and the data once transferred can be read in RAM when a fresh battery has been loaded. However, in this prior art photographic camera, all of the data are downloaded at a time, but cannot be downloaded selectively according to the contents thereof.

Other problems associated with E$^2$PROM lie in that E$^2$PROM requires a relatively large amount of electric power to carry out the rewriting and also a relatively long processing time, for example, 10 milliseconds, to complete the rewriting. This is turn brings about the increased consumption of the electric power in the camera with increase of the number of times of rewriting being performed.

SUMMARY OF THE INVENTION

Accordingly, the present invention has for its essential object to provide a improved photographic camera having a built-in E$^2$PROM wherein writing in E$^2$PROM of data which vary with the photo-taking occasion can be efficiently controlled.

Another important object of the present invention is to provide an improved photographic camera of the type referred to above, wherein, only when the film speed is required to be rewritten, the film speed, of which setting tends to be forgotten although it is the most important information for the photo-taking occasion, can be written.

In order to accomplish the object of the present invention, the latter is directed to the photographic camera comprising a film speed changing mode setting means for setting a mode for changing the film speed; a film speed setting means operable when the film speed changing mode is set to set the film speed to be changed by an external manipulation; a rewrite determining means for determining, in reference to the set film speed, whether or not a film speed memory of said E$^2$PROM is to be rewritten, and a rewrite means for rewriting, in the event that it is determined that the film speed is required to be rewritten, the film speed set by said film speed setting means in a storage area of said E$^2$PROM when the film speed changing mode is released, thereby to permit the rewriting of the film speed in said E$^2$PROM to be controlled.

In this construction, when the film speed is set during the film speed changing mode, a decision is made to determine if the film speed so set is to be rewritten in E$^2$PROM, and, if it is determined that it should be, the film speed can be rewritten in E$^2$PROM when the film speed changing mode is released.

According to another preferred embodiment of the present invention, there is provided a photographic camera comprising a focal plane shutter, a microcomputer for the control of the camera and E$^2$PROM, the write-in and erasing operations of which can be electrically controlled by the microcomputer. The present invention provides this type of photographic camera with a data assembly means for assembling data associated with the camera, a detecting means for detecting the start of travel of a trailing curtain of the focal plane shutter, and a control means operable in response to an output from the detecting means to write the data associated with the camera in E$^2$PROM.

In the construction according to the present invention, when the trailing curtain of the focal plane shutter starts its movement, the microcomputer goes at such timing through the writing of the data, associated with the camera, in E$^2$PROM, and this writing operation can be completed each time the actual photo-taking is completely carried out. Accordingly, no extra time is needed for the writing operation and, therefore, advantages can be appreciated in case of continued shooting.

BRIEF DESCRIPTION OF THE DRAWINGS

This and other objects and features of the present invention will become clear from the following description taken in conjunction with preferred embodiments thereof with reference to the accompanying drawings, in which:

FIG. 2 is a flowchart showing an interruption routine executed during the replacement of a battery;

FIG. 4(II) is a plan view of a display unit;

FIG. 10 is a flowchart showing a film wind-up subroutine;

FIG. 11 is a flowchart showing the control at the time of closure of the back cover;

FIGS. 19 to 21 are flowcharts, similar respectively to FIGS. 14 to 16, showing a fourth embodiment of the present invention;

FIGS. 22 and 23 are flowcharts, similar respectively to FIGS. 19 and 11, showing a fifth embodiment of the present invention;

DETAILED DESCRIPTION OF THE EMBODIMENTS

Hereinafter, the details of the present invention will be described in connection with the preferred embodiments thereof.

Figure 1:
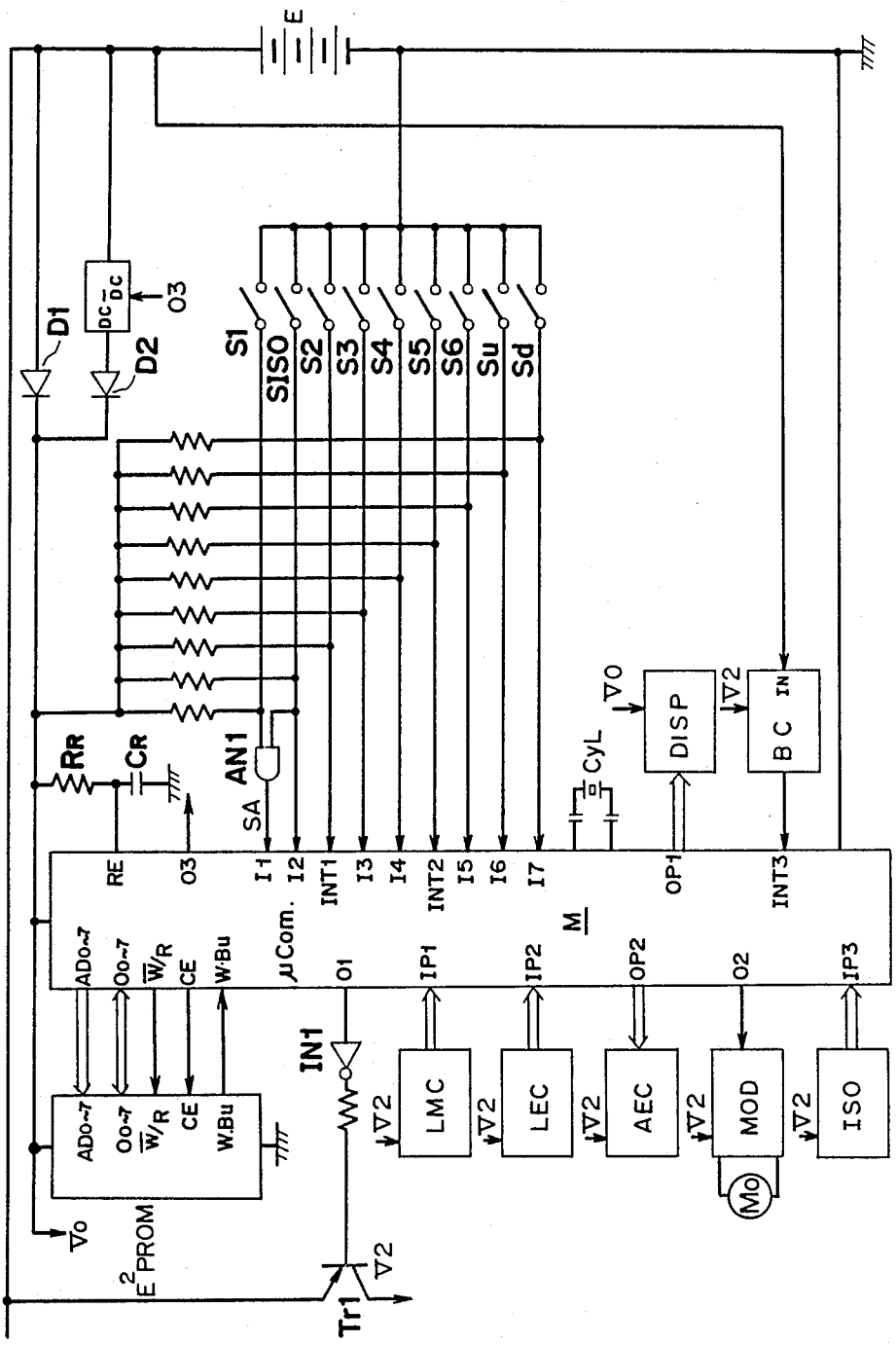
FIG. 1 is a schematic block circuit diagram showing a camera system according to a preferred embodiment of the present invention.

Referring first to FIG. 1 illustrating a block circuit diagram of one embodiment necessitated to accomplish the present invention, a battery for providing an electric power to various circuit components is identified by E. The various circuit components include a microcomputer M for controlling the entirety of a photographic camera and operable in a sequence as will be described later with reference to flowcharts; an electrically writeable and erasable read-only memory E²PROM having built therein a voltage boosting circuit wherefore, when a write-in signal is inputted to the read-only memory E²PROM, erasing is automatically performed and, at the same time, voltage can be increased to a value required for the write-in to accomplish the writing in the read-only memory E²PROM; a light measuring circuit LMC for measuring the brightness of a target object to be photographed, said light measuring circuit being capable of outputting to a microcomputer M a digital signal descriptive of brightness information expressed according to the APEX system; a lens circuit LEC capable of outputting to the microcomputer M a digital signal descriptive of the minimum aperture value peculiar to an interchangeable lens (not shown), which aperture value is expressed according to the APEX system; an exposure control circuit AEC for controlling an aperture and a focal plane shutter in dependence on exposure information supplied from the microcomputer M; a single frame wind-up circuit MOD for controlling a motor for winding a film frame to frame; and a film speed read-out circuit ISO for automatically reading, and outputting to the microcomputer M, respective digital signals descriptive of film information such as the film speed and the number of exposures available for a loaded film whose container is imprinted with DX coded film information.

The various circuit components referred to above also include a display unit DISP capable of effecting various displays on the basis of signals outputted from the microcomputer M; a battery check circuit BC operable to detect the voltage on the battery E and to halt the control of the photographic camera, when the voltage on the battery falls below a predetermined value, thereby to avoid any possible erroneous operation of the camera; said battery check circuit BC being capable of applying a battery check signal to the microcomputer M to permit the latter to execute the flow of an interruption routine BATINT as will be described later; and a converter DC-DC operable to supply a stable voltage of 5 volts to both the microcomputer M and the read-only memory E²PROM in the event that the voltage on the battery falls below a predetermined value.

The microcomputer M and the read-only memory E²PROM are connected together by means of address buses $AD_{0-7}$ through which addresses of ROM of the read-only memory E²PROM are specified; data buses $O_{0-7}$ through which data transmission takes place; W/R control line $\overline{W}/R$ through which write-in and write out signals are transmitted; a chip enable line CE through which signals for initiating write-in and write-out controls are transmitted; and a write busy line W.Bu through which a write busy signal descriptive of the write operation taking place is transmitted. These circuit components have respective terminals necessitated for this purpose.

The circuit shown therein also comprises a power supply transistor Tr1 for supplying the electric power to the circuit components other than the read-only memory E²PROM and the display unit DISP, a resistor $R_R$ and a capacitor $C_R$ for resetting the microcomputer M, diodes D1 and D2 for avoiding a reverse charging, and a crystal oscillator CyL for providing clocks to the microcomputer M.

Hereinafter, various switches used in the illustrated circuit will be described. Reference character S1 represents a photo-taking ready switch adapted to be switched on when a release button (not shown) is depressed through the first half of the stroke. Reference character SISO represents a film speed selector switch cooperable with any one of up-shift and down-shift switches Su and Sd so that, when both the selector switch SISO and one of the up-shift and down-shift switches Su and Sd are simultaneously depressed, that is, switched on, the setting of the film speed can be modified. It is to be noted that, in the event of the closure of any one of the photo-taking ready switch S1 and the selector switch SISO, the output of an AND circuit AN1 is converted from a high level state to a low level state, thereby to enable the microcomputer M to perform an intended operation.

Reference character S2 represents a release switch adapted to be switched on when the release button is subsequently depressed further through the latter half of the stroke, and, when a varying signal varying from a high level state to a low level state as a result of the closure of the release switch S2 is inputted to the microcomputer M, the microcomputer M executes a release routine to effect an exposure control and the subsequent film winding. Reference character S3 represents an exposure completion switch adapted to be switched on upon the completion of the exposure and also to be switched off by a charging mechanism (not shown) during the film winding. Reference character S4 represents a switch adapted to be switched on when each frame of the film has been completely wound and to be switched off by a mechanism (not shown) when the release has been effected.

Reference character S5 represents a back-cover closure detecting switch adapted to be switched on upon the closure of a back cover in the photographic camera to apply a signal varying from a high level state to a low level state to the microcomputer M so that the microcomputer M can execute an interruption routine for the back-cover closure to effect a predetermined control as will be described later. Reference character S6 represents a film detecting switch for detecting the absence or presence of the film. The film detected switch S6 is comprised of a spool accommodated within a film wind-up chamber and made of an electroconductive rubber connected to the ground, and a film presser piece pulled up with the power source through a resistor, and is adapted to be switched off when the film is wound on the spool. The up-shift and down-shift switches Su and Sd are switches used to carry up and down information desired to be modified, respectively, the actual carry-up or carry-down of the information taking place when one of the switches Su and Sd is closed simultaneously with the closure of one of the switches for different information desired to be modified.

The operation of the photographic camera will now be described with reference to the flowchart of FIG. 2 showing the sequence of operation of the microcomputer M.

(Replacement of Battery)

When the battery loaded in the camera has been replaced with a fresh one, a signal varying from a low level state to a high level state is inputted to a reset terminal RE of the microcomputer M through a reset circuit comprised of the resistor $R_R$ and $C_R$, wherefore the microcomputer M executes the flowchart shown in FIG. 2.

Referring to FIG. 2, the microcomputer M resets all of internal registers and flags to render output terminals O and output ports OP to be in a low level state at successive steps #5 and #10. Then, at step #15, data stored in $E^2$PROM are loaded in internal registers according to a subroutine shown in FIG. 3, it being, however, to be noted that, before reference is made to the subroutine of FIG. 3, description of addresses of $E^2$PROM and data inputted to these addresses will be made with reference to the following table labelled Table 1. It is also to be noted that the microcomputer M and $E^2$PROM both used are an 8-bit microcomputer and an 8-bit $E^2$PROM.

TABLE 1

| Addresses | Contents of Data (8 bits) | Addresses of Register in Microcomputer |
|---|---|---|
| 00 | Description of Number of Releases<br>b0, b1, b2<br>0  0  0   10000 or less<br>1  0  0   20000 or less<br>0  1  0   30000 or less<br>1  1  0   30000 or more<br>*  *  1   40000 or more | 0 |
| 01, 11<br>21, 31 | Lower Significant 8 bits of the Number of Releases<br>11, 21, 31 are spare bytes | 1 |
| 02, 12<br>22, 32 | Higher Significant 8 bits of the Number of Releases<br>12, 22, 32 are spare bytes paired with 11, 21, 31 in the above column. | 2 |
| 03, 13<br>23, 33 | Descriptive of the Number of Exposures Made on the Film<br>13, 23, 33 are spare bytes | 3 |
| 04 | Film speed | 4 |

At an address "00" of $E^2$PROM, the cumulative number of releases actually effected is inputted in the form as expressed in ten thousands and, assuming that (b0, b1, b2) = (0, 0, 0), (1, 0, 0), (0, 1, 0), (1, 1, 0), or (*, *, 1) and that the cumulative number of releases is expressed by N, $N \leq 10000$, $10000 < N \leq 20000$, $20000 < N \leq 30000$, $30000 < N \leq 40000$, or $N > 40000$. This is used for the purpose of alleviating the limit of a memory for rewriting the cumulative number of releases or the number of exposures made on the film which would be imposed as a result of the limitation in number of rewriting $E^2$PROM and, more specifically, the unit of 10000 releases that is arranged for rewriting is detected in reference to the above bits so that, when the rewriting is detected as having been carried out 10000 times, a byte (address) for the rewriting can be changed.

Addresses, (01), (11), (21) and (31) are used to store contents of the lower significant 8 bits of the cumulative number of releases. Specifically, when the cumulative number of releases is of a value smaller than 10000, within the range of 10001 to 20000, within the range of 20001 to 30000, and within the range of 30001 to 40000, the addresses (01), (11), (21) and (31) are respectively utilized. Addresses (02), (12), (22) and (32) are used to store contents of the higher significant 8 bits of the cumulative number of releases and are paired with the above mentioned addresses (01), (11), (21) and (31) to render a 16-bit construction, respectively, and the addresses of the memory for the cumulative number of releases then effected correspond respectively to the addresses (01), (11), (21) and (31). Addresses (03), (13), (23) and (33) are used to store the number of exposures made on the film and are used for each cumulative number of releases in a manner similar to that described above. An address (04) is used to store the film speed. Since the film speed is changed infrequently, that is, since the number of rewriting of the film speed is small, no spare byte is provided.

Figure 3I:
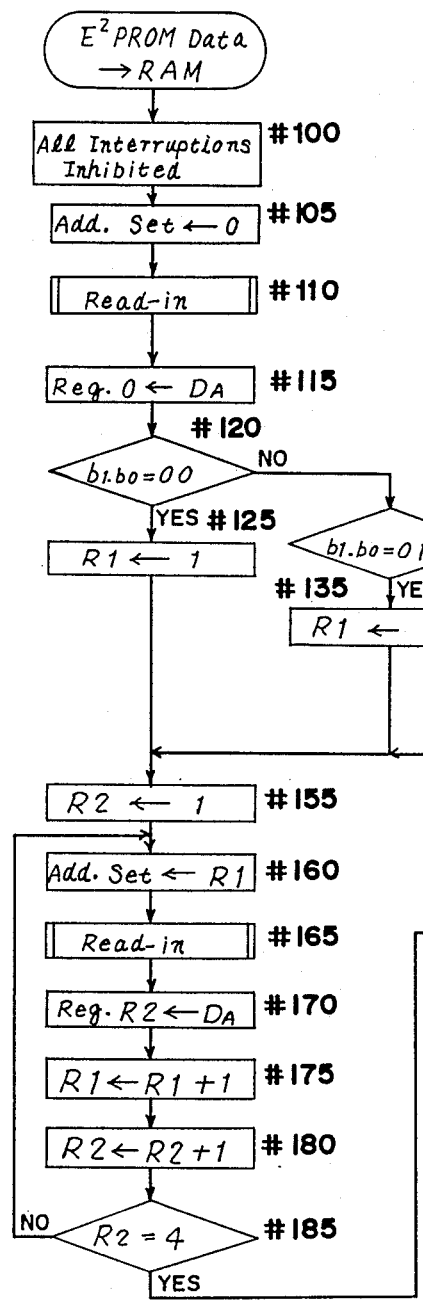
FIGS. 3(I) and 3(II) are flowcharts showing the loading of data from RAM to E²PROM.

Referring back to FIG. 3, the subroutine for reading the data from E²PROM will be described with reference to FIGS. 3(I) and 3(II). As shown in FIG. 3(I), the microcomputer M inhibits, at step #100, all interruptions so that data being read in would not become erroneous data during the read operation. Then, at step #105, the address "0" for the data to be read is set, followed by the execution of a subroutine for reading data from E²PROM at step #110. This subroutine is shown in FIG. 3(II).

Figure 3:
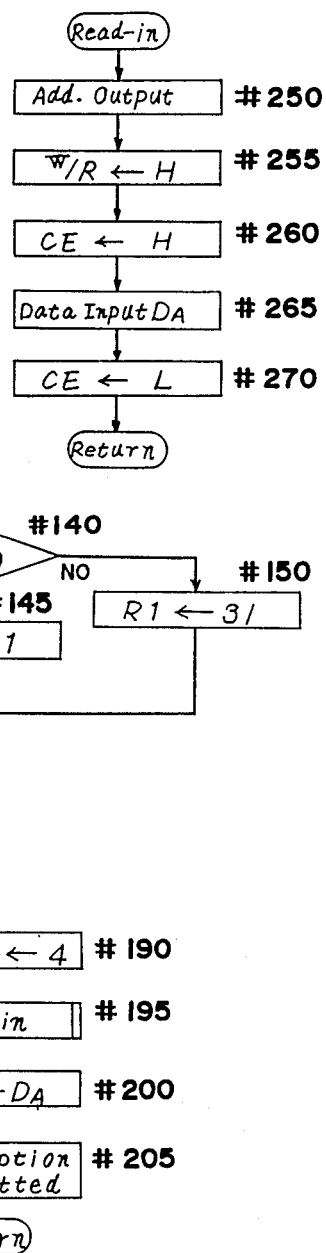

Referring to FIG. 3(II), the data of the address (the address "0" is currently set) is outputted to an address bus at step #250; a signal of $\overline{W}/R$ is rendered to be in a high level state at step #255 to establish a read-in mode (as viewed from the microcomputer M); the chip enable terminal CE is rendered to be in a high level state at step #260; and that E²PROM in the read-in mode for reading the data of the above mentioned address is latched. E²PROM operates to decode the address latched and outputs the data DA of the address to the data bus at step #265, which address data are subsequently inputted to the microcomputer M. Although according to this flowchart the microcomputer M outputs the chip enable signal CE and receives the DA immediately, a wait step may be employed immediately after the outputting of the chip enable signal CE in the event that the processing speed of the microcomputer is fast.

After the inputting of the data DA, the microcomputer M renders the chip enable signal CE to be in a low level state to complete the reading of one byte of data at step #270, subsequently returning to the flowchart of FIG. 3(I), particularly to step #115 shown therein. At step #115, the data DA is outputted to a register 0, and then at step #120, b1, b0 of the data DA are determined to detect the address of E²PROM at which data of the cumulative number of releases and the number of exposures made on the film are stored. If the result of decision at step #120 indicates (b1, b0)="00", it means that the rewriting number N is of a value smaller than 10000 and, therefore, an address specifying parameter R1 is rendered to be 1 at step #125. In the event of (b1, b0)="01" as determined at step #130, it means that the rewriting number N is of a value 10000<N≦20000 and, therefore, the parameter R1 is rendered to be 11 at step #135; in the event of (b1, b0)="10" as determined at step #135, it means that the rewriting number N is of a value 20000<N≦30000 and, therefore, the parameter R1 is rendered to be 21 at step #145; and in the event of (b1, b0)="11", it means that the rewriting number N is of a value 30000<N≦40000 and, therefore, the parameter R1 is rendered to be 31 at step #150. The address specifying parameter R1 represents the address at which the data of the lower significant 8 bits of the cumulative number of releases is stored. Thereafter, a register specifying parameter R2 is rendered to be "1" at step #155; the address is set to the above mentioned address specifying parameter R1 at step #160; the data of the lower significant 8 bits of the cumulative number of releases is read from E²PROM at step #165; and such data is stored in a register 1 in the microcomputer M at step #170. Thereafter, the address specifying parameter R1 is added with "1" to provide a new address specifying parameter R1 at step #175, and the register specifying parameter R2 is added with "1" to provide a new register specifying parameter at step #180. By repeating this procedure at steps #160 to #180 until the register specifying parameter R2 becomes 4, the data of the higher significant 8 bits of the cumulative number of releases are read from E²PROM for the storage in a register 2 and the data of the number of exposures made on the film is read from E²PROM for the storage in a register 3 (steps #160 to #185). Then, in order to read the remaining data of the film speed from E²PROM, the microcomputer M sets the address to "4" at step #190, reads the data at step #195, and permits the interruption to return at step #205 after the data DA has been stored in an internal register 4. In this way, the writing of the data stored in E²PROM in the registers 0 to 4 is carried out.

After the completion of the writing of the data from E²PROM to the register, the microcomputer M proceeds to step #20, shown in FIG. 2, to determine which one of the photo-taking ready switch S1 and the film speed selector switch SISO is closed. If none of these switches S1 and SISO is closed, a decision is made at atep #25 to determine if a termination flap ENDF has been set. If it has been set, step #20 takes place again, but if it has not been set, terminals 01 and 03 are rendered to be in a low level state to permit the power supply transistor Tr1 and the DC-DC converter to be switched off at steps #30 and #35. Then, the termination flag ENDF is set at step #40, and all displays are turned off at step #42, followed by the return to step #20.

Should the result of decision at step #20 indicate that either of the ready switch S1 and the selector switch SISO has been closed, the program flow proceeds to step #45 at which the termination flag ENDF is reset, followed by the resetting and start of a timer at step #50. This timer is a hard timer built in the microcomputer M and is used for the retention of the power source. Subsequently, the terminal 01 is rendered to be in a high level state to switch the power supply transistor TR1 on at step #55. The terminal 03 is then rendered to be in a high level state to switch the DC-DC converter on at step #60 so that, even when the power source voltage is lowered, a predetermined voltage can be supplied to the microcomputer M and E²PROM. At step #65, a decision is made to determine if the selector switch SISO has been switched on, and if it has been switched on, a subroutine for the selection of the film speed (change of the ISO value) takes place at step #70, which subroutine is shown in FIG. 4(I).

(ISO Selection)

Figure 4I:
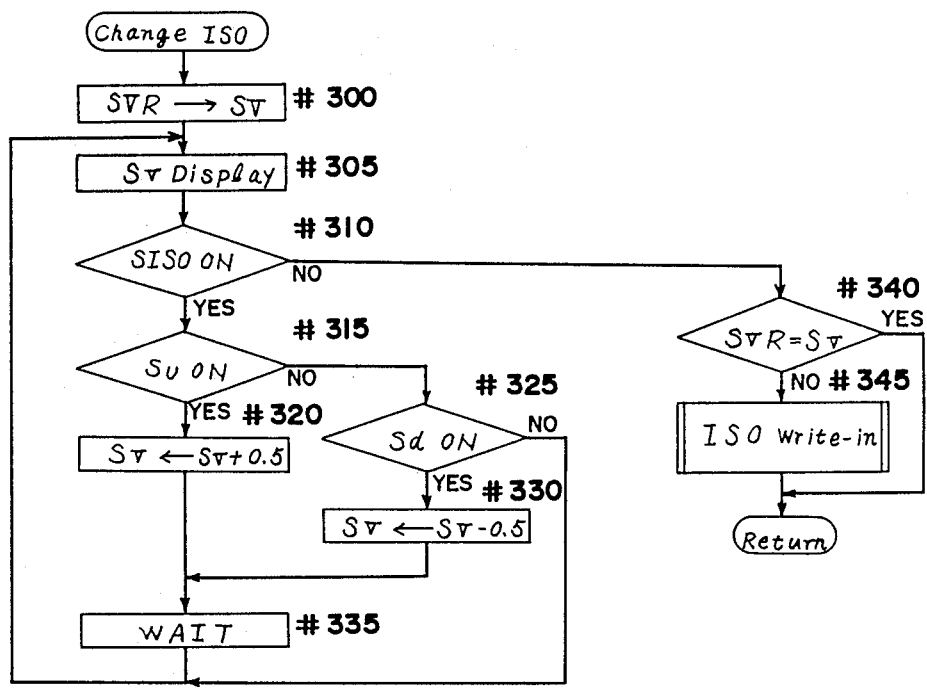
FIG. 4(I) is a flowchart showing an ISO changing subroutine.

Referring to FIG. 4(I), a data stored in an SV register SvR is read out and is rendered to be Sv at step #300, which data is then outputted to the display unit at step #305. The display unit DISP makes use of only "ISO

"ISO ▢ ▢ ▢ ▢"

of the display through which the film speed can be displayed. It is to be noted that Sv is expressed according to the APEX system. At step #310, the microcomputer M makes a decision to determine if the selector switch SISO Has been switched on, and if it has been switched on, decisions are made at steps #315 and #325 to determine which one of the up-shift and down-shift switches Su and Sd is switched on. Should the up-shift switch Su be switched on, 0.5 is added to the film speed Sv at step #320, but should the down-shift switch Sd be switched on, 0.5 is subtracted from the film speed Sv to provide a new film speed Sv at step #330. Then, when the program flow proceeds to step #335 at which a wait is made for a predetermined time to avoid a continuous change, followed by step #305.

In the event that neither of the up-shift and down-shift switches Su and Sd is closed, the program flow returns from step #325 to step #305, repeating this flow while the film speed is displayed. At step #310, when the microcomputer M detects that the film speed selector switch SISO has been opened, a decision is made at step #340 to determine if the film speed SvR stored in the SV register SvR is equal to the modified film speed Sv. If the film speed SvR is equal to the modified film speed Sv, the program returns to the flow of FIG. 2, but if it is not equal, an ISO write-in subroutine takes place at step #345 to write the modified film speed Sv in E$^2$PROM, followed by the return to the flow of FIG. 2. Thus, when the modified film speed Sv and the film speed SvR stored in E$^2$PROM are equal to each other, no data is written in E$^2$PROM and, by reducing the number of rewriting, effective countermeasures can be provided to the limitation on the number of rewriting in E$^2$PROM.

Figure 5:
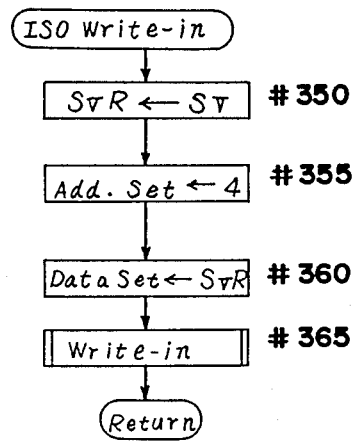
FIG. 5 is a flowchart showing an ISO write-in subroutine.

The ISO writing subroutine is shown in FIG. 5. At the outset, the modified film speed Sv is stored in the SV register SvR; the address of E$^2$PROM to be written is set to "4"; the contents SvR of the SV register SvR are set in a register for the data outputting, followed by a write-in subroutine at step #365; and the program flow returns after the writing has been completed.

Figure 6:
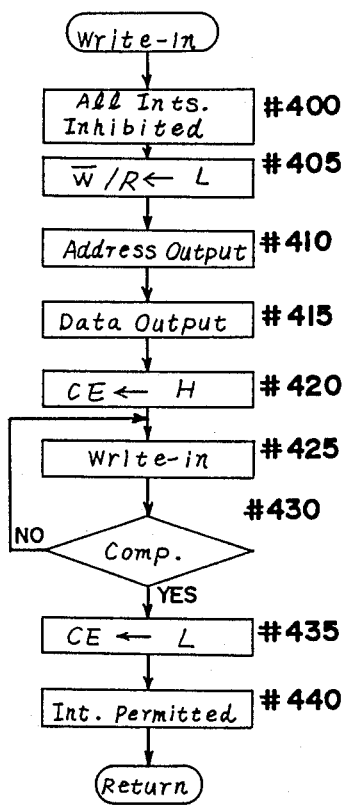
FIG. 6 is a flowchart showing a similar ISO write-in subroutine.

The write-in subroutine referred to above is shown in FIG. 6. The microcomputer M prevents, at step #400, the destruction of the data by inhibiting any possible interruption which would take place during the write-in operation. Then, a write/read terminal $\overline{WR}$ is rendered to be in a low level state at step #405 to establish a write-in mode, followed by the outputting of a data of the address "4" so set as hereinbefore described at steps #410 and #415. Subsequently, the chip enable terminal CE is rendered to be in a high level state at step #420 to cause E$^2$PROM to initiate the write-in operation at step #425. During the write-in operation, E$^2$PROM outputs a high level signal from the write busy terminal W.Bu, but outputs a low level signal upon the completion of the write-in operation. The microcomputer M waits at step #430 until this termination signal is brought in a low level state, and when this signal is outputted, the chip enable terminal is rendered to be in a low level state at step #435 to output a write-in mode termination signal to E$^2$PROM, permitting the interruption followed by the return at step #440. It is to be noted that, where the microcomputer has no write busy terminal W.Bu, the measurement of a time required by the writing may be performed to provide a wait time.

In this way, the ISO modifying subroutine is terminated.

(Preparation for Photo-taking)

At step #65 shown in FIG. 2, in the event that the film speed selector switch SISO is not closed, a subroutine for the preparation of the actual photo-taking takes place.

Figure 7:
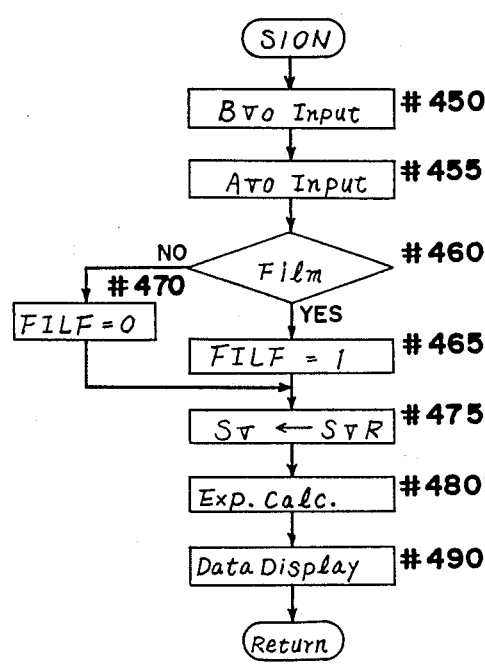
FIG. 7 is a flowchart showing a subroutine for a ready-to-photograph condition.

Referring to FIG. 7 showing the subroutine for the preparation of the actual photo-taking, the microcomputer M receives a full-aperture measured light value Bvo and a minimum aperture value Avo peculiar to the lens from the light measuring circuit LMC, being driven as a result of the closure of the power supply transistor Tr1, and the lens circuit LEC, respectively, at steps #450 and #455.

At subsequent step #460, a decision is made to determine if the film has been loaded. If the film has been loaded, a flag FILF representative of the presence o the film is set at step #465, but if it has not yet been loaded, the flag FILF is reset at step #470.

Thereafter, the film speed SvR stored in the SV register SvR is read out at step #475, followed by the execution of a predetermined exposure calculation with the use of the full-aperture measured light value Bvo, the minimum aperture value Avo peculiar to the lens and the film speed Sv at step #480. The shutter speed and the control aperture value, both determined by the exposure calculation, and the data of the number of exposures made on the film are supplied to the display unit DISP at step #490 so that, of the displays, "Tv   □ □, Av ,  or  "

is displayed, followed by the return of the program flow.

Reverting to FIG. 2, upon the completion of either the ISO modifying subroutine or the S1ON subroutine (step #70 or #75), the microcomputer M makes a decision at step #80 to determine which one of the read switch S1 and the selector switch SISO has been closed, and if any one of them is switched on, the program flow returns to step #45 to repeat the routine. On the other hand, if none of the switches S1 and SISO is closed, a decision is made at step #85 to determine if a timer which has been caused to start at step #50 has counted 10 seconds. If 10 seconds has been passed, the program flow proceeds to step #30 to carry out the flow for the termination of the photo-taking, but if 10 seconds has not yet been passed, the program flow returns to step #55 to repeat the routine until the shutter release is effected.

(Shutter Release)

Figure 8:
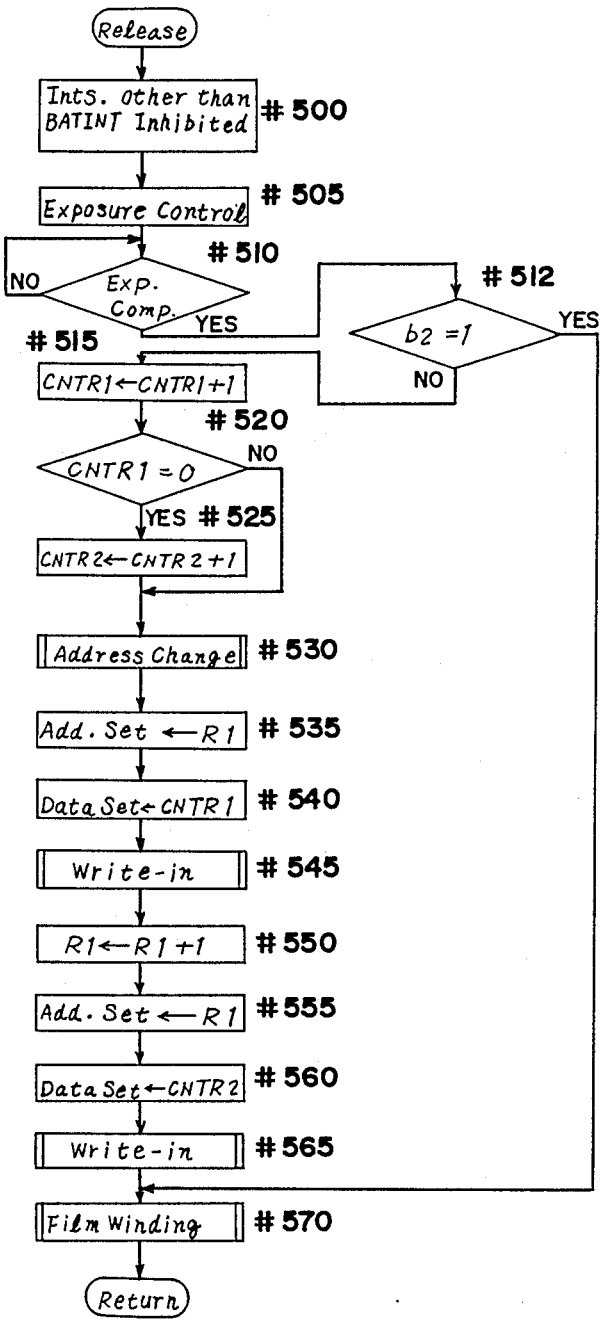
FIG. 8 is a flowchart showing the control at the time of shutter release.

When the release switch S2 is closed, the microcomputer M executes a control process for the photo-taking as shown in FIG. 8.

At the outset, the microcomputer M inhibits interruptions other than a battery replacement interruption BATINT at step #500 and then performs both a control for the release operation and a control for the exposure at ste #505. The exposure control can be carried out by supplying to the exposure control circuit AEC a travel start signal of a leading curtain (first curtain) and a trailing curtain (second curtain). Upon the completion of the exposure (steps #510 to #512), the exposure completion switch S3 is closed and, when an ON signal is inputted from the switch S3, the microcomputer M makes a decision at step #512 to determine if the bit b2 of a register at the address "0" in the microcomputer M is set to "1", that is, if the rewriting number N has exceeded 40000 and, if it is set, the program flow proceeds to a film wind-up subroutine at step #570 without rewriting the content of E$^2$PROM because, even though the content of E$^2$PROM is rewritten, the data in excess of 40000 can no longer be reliable. This film wind-up subroutine will be described later. If the above mentioned bit b2 is not "1", the microcomputer M address "1" to a counter CNTR1 for counting a lower significant bit of the internal cumulative number of releases at step #515, followed by a decision at step #520 to determine if this value is "0", that is, if a carry takes place from the lower significant 8 bits. If the carry takes place, "1" is added to an upper counter CNTR2 at step #525. Then, the program flow proceeds to a subroutine (step #530) for modifying the address that specifies the address which is to be modified according to the extent of the rewriting number. Even when the lower counter CNTR1 is not "0", the subroutine for the address modification is executed.

Figure 9:
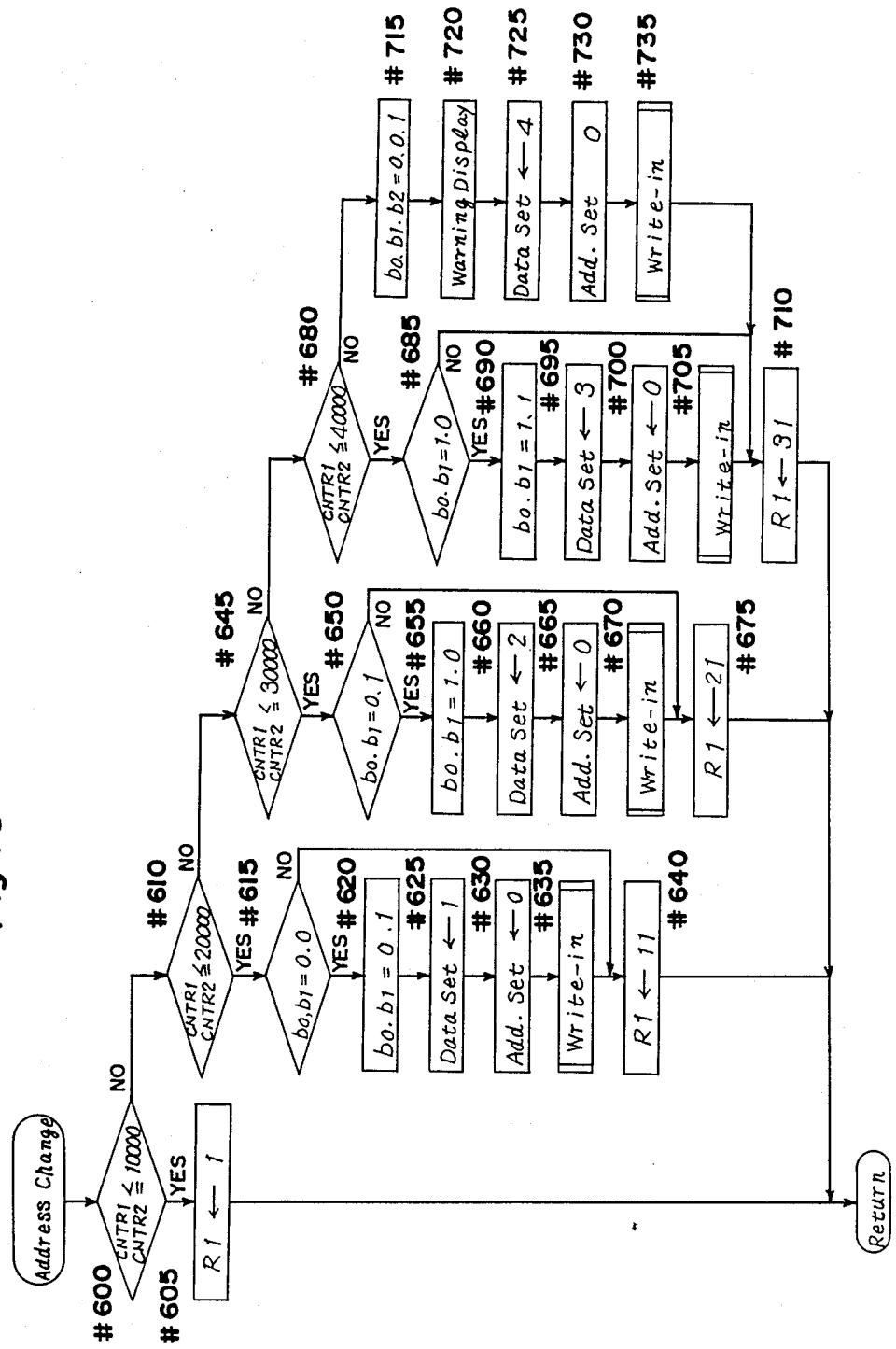
FIG. 9 is a flowchart showing an address change subroutine.

FIG. 9 illustrates the subroutine for the address modification. Referriing thereto, the microcomputer M makes a decision at step #600 to determine if the contents of both of the upper and lower counter CNTR2 and CNTR1 are equal to or smaller than 10000, and if it is equal to or smaller than 10000, the address specifying parameter R1 representative of the address for the writing of the cumulative number of releases is set to "1" at step #605, followed by the return of the program flow.

The microcomputer M executes steps #615 et seqq., if the contents N of the counters CNTR1 and CNTR2 referred to above are of values within the range of $10000 < N \leq 20000$. At step #615, a decision is made to determine if the bits (b0, b1) indicative of the unit of ten thousands of the cumulative number of releases are (0, 0). In the event of (0, 0), it means that the cumulative number of release has exceeded 10000 for the first time, that is, the cumulative number of releases is 10,001 and the bits (b0, b1) are set to (0, 1); a data transfer register is set to "1", that is, the data of (b0, b1)=(0, 1) is set; the address of E²PROM is set to "0"; and the program flow proceeds to the rewriting subroutine to read it (steps #620 to #635).

Thereafter, the address specifying parameter R1 for the writing of the cumulative number of releases is set to 11 at step #640, with the program flow subsequently returning. Even when the bits (b0, b1) are not (0, 0), the program flow proceeds to step #640 and a similar process takes place. If the contents of the counters CNTR1 and CNTR2 are of respective values within the range of $20000 < N \leq 30000$ and $30000 < N \leq 40000$, a process similar to that effected when a value within the range of $10000 < N \leq 20000$ is carried out. If the contents of the counter are of a value within the range of $20000 < N \leq 30000$, a decision is made to determine if the content of the bit is (b0, b2)=(0, 1). If it is (0, 1) signifying that the cumulative number of releases has exceeded 20000, it is set to (1, 0) and the address is set to "0", permitting the program flow to proceed to the writing subroutine during which the writing is effected to E²PROM and the address specifying parameter R1 is set to "21" with the program flow returning (steps #650 to #675). If it is not (0, 1), the address specifying register R1 is set to "21" (step #675), followed by the return of the program flow. Similarly, the contents of the counters CNTR1 and CNTR2 are of respective values within the range of $30000 < N \leq 40000$, a decision is made to determine if the content of the bit (b0, b1) is (1, 0). If it is (1, 0) signifying that the cumulative number of releases has exceeded 30000, the bit (b0, b1) is set to (1, 1), and the address is set to "0", permitting the program flow to proceed to the writing subroutine during which it is written in E²PROM (steps #685 to #705). Thereafter, the address specifying parameter R1 is set to "31", followed by the return of the program flow (step #710). If the bit is not (b0, b1)=(1, 0), the address specifying parameter R1 is set to "31", followed by the return of the program flow. If the contents of the counters CNTR1 and CNTR2 have exceeded 40000, the bit (b0, b1, b2) at the address "0" of the microcomputer M is set to (0, 0, 1), a data for a warning display is outputted to the display unit, and the data is set to "4" (steps #715 to #725). Then, the address is set to "0", the data of the bit (b0, b1, b2) is written in E²PROM, and the address specifying parameter R1 is set to "31", followed by the return of the program flow. This warning is for the purpose of inviting a photographer to bring his camera to a camera servicing station because 40000 releases have been effected. It is, howver, to be noted that this number may not be always limited to 40000, but may be greater than 50000, in which case the number of memories of E²PROM for rewriting the number of releases is to be correspondingly increased.

With reference again to FIG. 8, the microcomputer M sets the address specifying parameter R1 to a register for the address at step #535; the content of the lower counter CNTR1 is subjected to data-set at step #540; and the writing subroutine is executed at step #545 to write the data in. Thereafter, the address specifying parameter R1 is added with "1" at step #555 to render it to be an address for E²PROM for the higher significant bits, which is in turn set in a register for the address, followed by the data-setting of the content of the higher counter CNTR2 at step #560 which is in turn followed by the execution of the writing subroutine at step #565 for the data writing.

Upon the completion of the data rewriting, the microcomputer M executes a process of film winding.

(Film Winding)

The film winding subroutine is shown in FIG. 10. Referring to FIG. 10, the microcomputer M inhibits interruptions other than a back-cove interruption, battery replacement interruption BATINT at step #750 and outputs a signal, necessary to switch on a winding motor Mo, from a terminal 02 to the winding circuit MOD at step #755. After a wait has been made at step #760 until the completion of the film winding, and when the winding completion switch S4 is closed, the microcomputer M detects it and outputs a signal for halting the motor at step #765. Then, a decision is made at step #770 to determine if a flag FILF indicative of the presence or absence of the film is set. If the flag FILF is set, another decision is made at step #773 to determine if the bit b2 at the address "0" in the microcomputer M is "1". In the event of the absence of the film or in the event that the rewriting number N of E²PROM has exceeded 40000 (b2=1), interruption is permitted at step #772 with the program flow returning, without rewriting the number of exposures made on the film. On the other hand, in the event of the presence of the film and of the rewriting number N not exceeding 40000, a parameter NR descriptive of the number of exposures made on the film is added with "1", at step #775, and the address specifying parameter R1 is added with "2" at step #780 to determine the address for rewriting the number of exposures made on the film. Then, the address specifying parameter R1 is set to a register for the address at step #785, and a data NR is subjected to data-set at step #790, followed by the execution of the writing subroutine at step #795, the program flow returning after the number of exposures made on the film has been written in E²PROM.

(Back Cover Closure)

The operation of the camera which takes place when the back cover then opened is closed will now be described with reference to the flowcharts of the microcomputer M shown in FIGS. 11 and 12.

When the back cover is closed, a back-cover closure detecting switch S5 is closed and, when a signal varying from a high level state to a low level state is inputted to the microcomputer M, the microcomputer M executes a routine for writing the closure of the back cover shown in FIG. 11. At the outset, and at step #800, a detection is made to find whether or not the film has been loaded (wound onto the spool), and in the event that the film has been loaded, it means that the back cover has been erroneously opened and, therefore, the program proceeds to step #815 without carrying out an initial loading. If no film has been loaded, the program proceeds to a subroutine for the initial loading (initial winding) at step #805.

Figure 12:
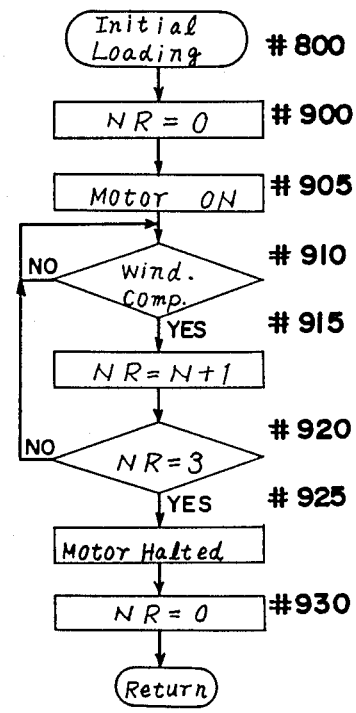
FIG. 12 is a flowchart showing an initial load subroutine.

Referring now to FIG. 12 illustrating the subroutine for the initial loading, the microcomputer M sets, at step #900, the parameter NR representative of the number of exposures made on the film to "0" and then outputs a signal, necessary to switch the winding motor Mo on, to initiate the winding at step #905. After a wait has been made at step #910 until the completion of the film winding, the parameter NR is added with "1" at step #915 and this winding operation is repeated at step #920 until the parameter NR becomes "3". When the parameter becomes "3", that is, upon the completion of the initial winding, the winding motor Mo is brought to a halt at step #925, followed by the resetting of the parameter NR to "0" at step #930. The program flow then returns.

Referring to FIG. 11, upon completion of the initial loading at step #805, the microcomputer M makes a decision at step #810 to determine if the film has been loaded. In the event that the film has been loaded, the flag FILF is set at step #815, followed by a decision at step #825 to determine if the film loaded in a DX film whose container is formed with an electric pattern representative of the film speed. This decision can be carried out in any known manner, for example, by determining if at least one of lower significant two bits descriptive of the film speed is in a conductive state with a common terminal on the film container. Where the film used is the DX film, the film speed Sv is automatically read at step #830 and a data indicative of the value thereof is outputted to the display unit at step #840. On the other hand, where no film is loaded, the film flag FILF is reset at step #820. Also, where no film is loaded, or where the film loaded is not the DX film, the film speed SvR stored in a register is rendered to be Sv at step #835, and the value thereof is then outputted to the display unit for the display thereof at step #840. Thereafter, a comparison is made at step #845 between the film speed SvR stored and the film speed Sv referred to above, and if both are not identical, the program flow proceeds to the ISO writing subroutine at step #850 to carry out the wiring of the film speed Sv in E²PROM (steps #845 and #850). Should both be identical, the program flow skips step #850 and proceeds to step #855 without carrying out the writing in E²PROM, at which step #855 a decision is made to determine if a termination flag ENDF has been set. If the termination flag ENDF has been set, the routine SA is executed, but if it has not been set, the program flow returns to the step preceding the interruption.

Figure 13:
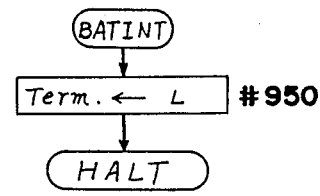
FIG. 13 is a flowchart showing a battery interruption.

When the voltage of the battery is lowered to a value slightly higher than the voltage at which the microcomputer M, E²PROM and the other circuit components may result in an erroneous operation, a signal indicative thereof is inputted from the battery check circuit BC to the microcomputer M wherefore the microcomputer M executes a BATINT routine shown in FIG. 13. The microcomputer M renders all of the output terminals to be in a low level state at step #950 and then halts. The halt of the microcomputer also results in the interruption of the clocks.

(Second Embodiment)

In the foregoing embodiment, the writing of the cumulative number of releases is always subjected to both the upper 8 bits and the lower 8 bits. With respect to the upper 8 bits, while the modification is required only one time per 256 times, the rewriting each time would result in the prolonged processing time which in turn results in the increase of the electric current (electric power) being consumed and, moreover, a plurality of spare memories are required in E²PROM In view of the limitation of the rewriting number. The purpose of the second embodiment which will now be described is to substantially eliminate the above discussed problems and this can be accomplished by rewriting the upper 8 bits only when the contents of the upper 8 bits have changed.

TABLE 2

| Addresses in E²PROM | Contents of Data (8 bits) | Addresses of Register in Microcomputer |
| --- | --- | --- |
| 00 | Higher Significant 8 bits of the Number of Releases | 0 |
| 01, 11 21, 31 | Lower Significant 8 bits of the Number of Releases 21, 31, 31 are spare bytes | 1 |
| 03, 13 23, 33 | Descriptive of the Number of Exposures Made on the Film 13, 23, 33 are spare bytes | 3 |
| 04 | Film speed | 4 |

At the address "00" of E²PROM, a data of the higher significant 8 bits descriptive of the cumulative number of releases is stored. In such case, since the rewriting takes place one time per 256 times, and assuming that the count if made up to 40000, the rewriting is carried a number of times obtained by dividing 40000 by 256 (40000/256=156.25), that is, 156 times and, therefore, no spare byte is required for the limitation (10000 times) for the rewriting number. Other differences lie in that addresses (02, 12, 22, 32) of E²PROM are eliminated and in that the address (00) shown in Table 1 is eliminated, and this is because the cumulative number of releases is made to be determined with reference to the higher significant 8 bits of the cumulative number of releases. A modification of the flowchart of the microcomputer M which has been made for the purpose of accomplishing the above is shown in Figs. 14 to 16.

Figure 14:
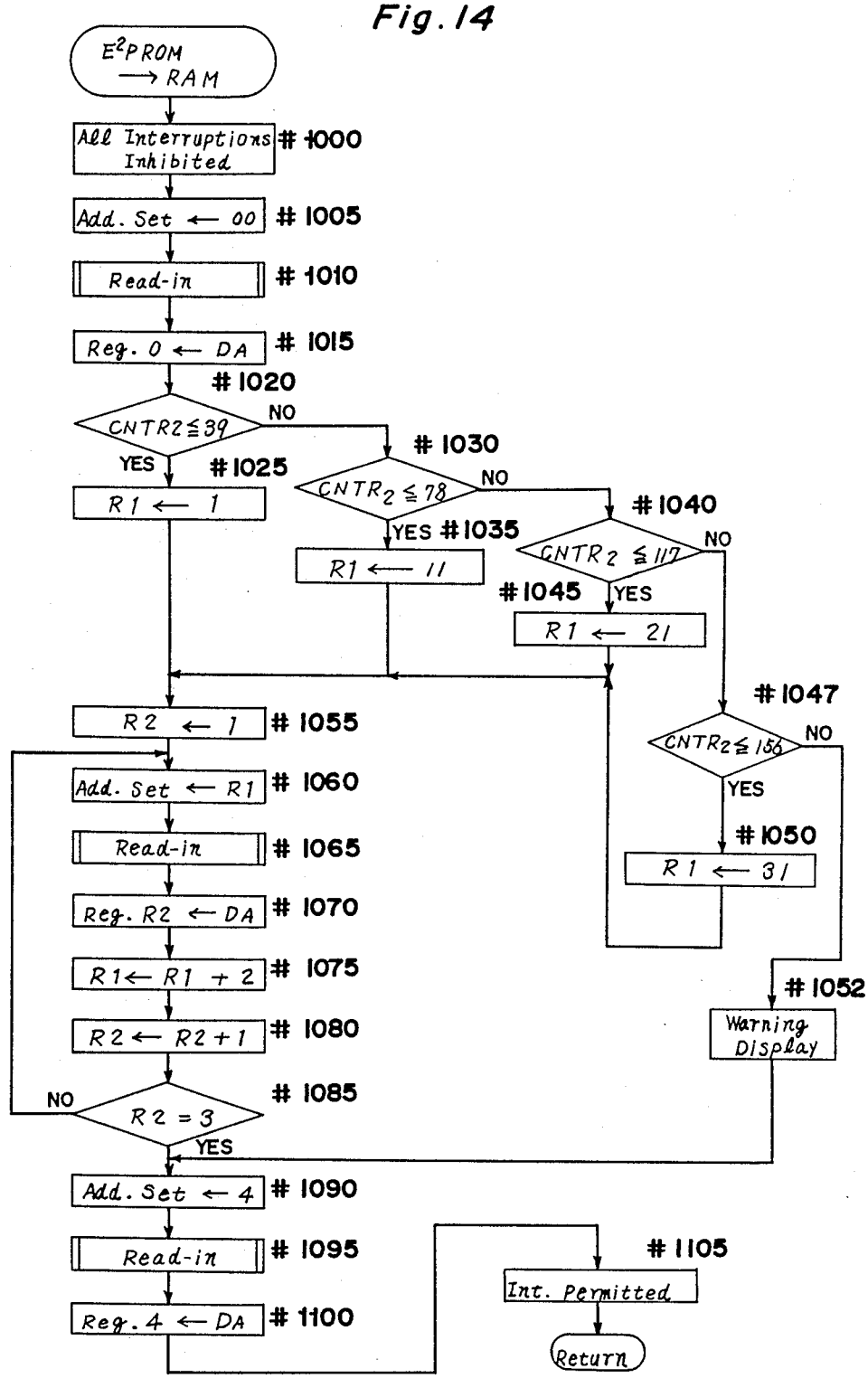
FIG. 14 is a flowchart similar to FIG. 2, showing an interruption routine of a second embodiment of the present invention.

FIG. 14 illustrates a modification of step #15 shown in FIG. 2. Referring to FIG. 14, at step #1000, all of the interruptions are inhibited and the address for E²PROM are set to "00" at step #1005. The content DA corresponding to this address is read out from E²PROM at step #1010 and is then set in the address "0" of the register in the microcomputer M. The content of this counter CNTR2 is then decoded and, if this value is equal to or smaller than 39 (9984 times), the address specifying parameter R1 is rendered to be "1" (steps #1020 and #1025). Similarly, if the content of the counter CNTR2 is equal to or smaller than 78 (19968 times), equal to or smaller than 117 (29952 times) and equal to or smaller than 156 (39936 times), the address specifying parameter R1 is rendered to be "11" (steps

1030 and #1035), to be "21" (steps #1040 and #1045) and to be "31" (steps #1047 and #1050), respectively, followed by the execution of step #1055. Where the content of the counter CNTR2 exceeds 156, a data for effecting a warning display for indicating that the limit of the rewriting number of E$^2$PROM has been exceeded is supplied to the display unit DISP at step #1052, followed by step #1090 without E$^2$PROM being rewritten. The subsequent flow is substantially identical with FIG. 3(I), it being, however, that consequent upon the modification of the content of the memory of E$^2$PROM, step #1075 which corresponds to step #175 is changed to R1←R1+2 and, further, at step #1090 which corresponds to s tep #180, the address is changed to "4".

Figure 15:
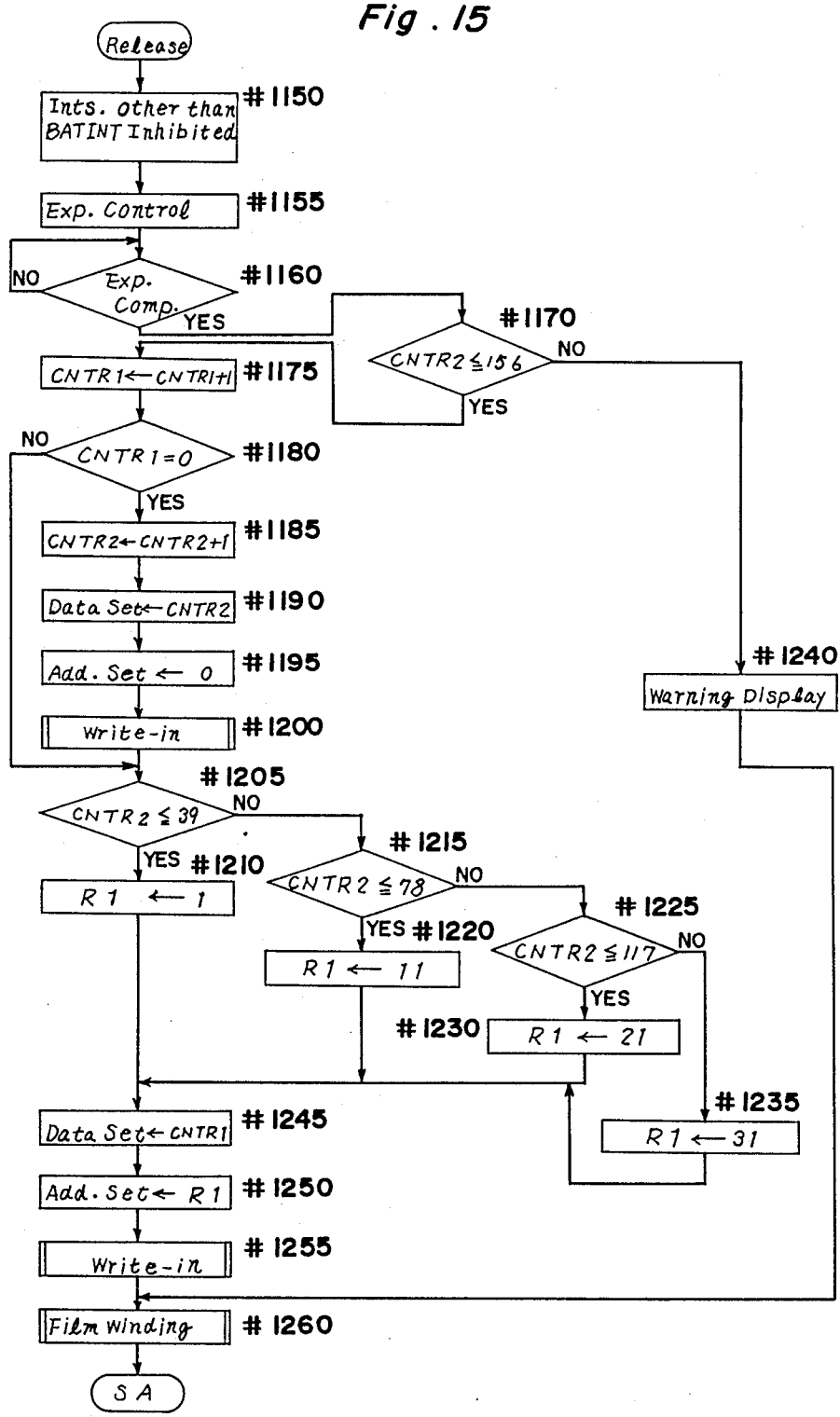
FIG. 15 is a flowchart similar to FIG. 8, showing a shutter release routine of the second embodiment.
Figure 16:
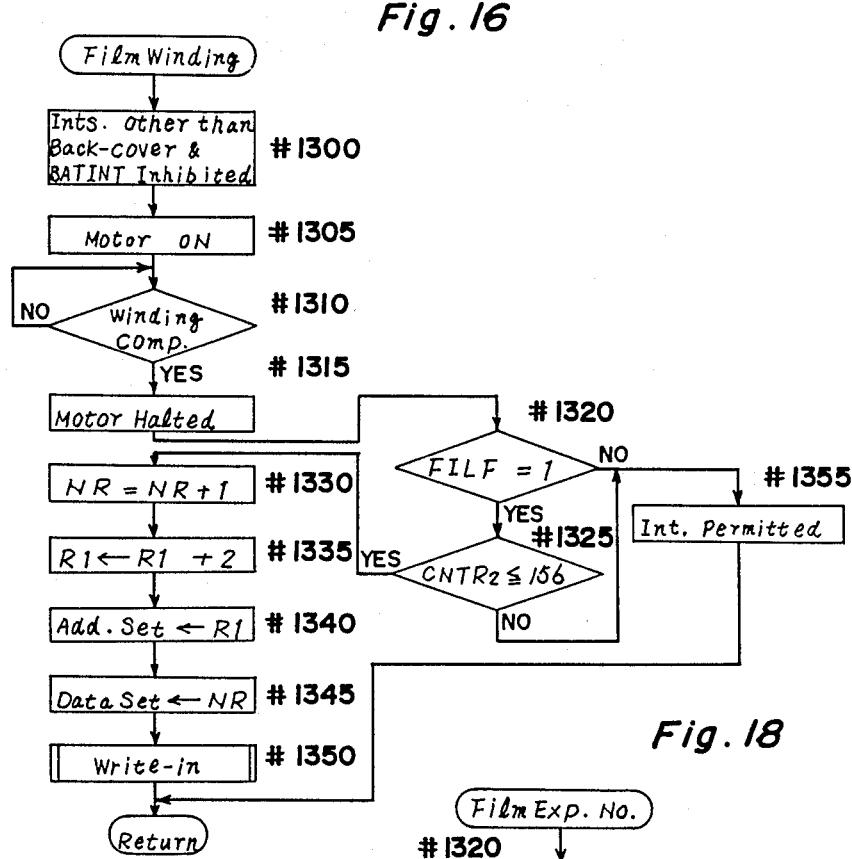
FIG. 16 is a flowchart similar to FIG. 10, showing a wind-up subroutine of the second embodiment.

FIG. 15 illustrates a modification of the release routine shown in FIG. 8. Referring to FIG. 5, the microcomputer M inhibits interruptions other than the BATINT interruption at step #1150 and then performs an exposure control at step #1155. Upon completion of the exposure control at step #1160, and if the counter CNTR2 of the higher significant 8 bits is in excess of 156, data for effecting the warning display to show that the limit of the rewriting number of E$^2$PROM has been exceeded is outputted at step #1240, followed by the film winding subroutine at step #1260. However, if the counter CNTR2 is equal to or smaller than 156, "1" is added to the counter CNTR1 at the lower significant 8 bits at step #1175, followed by a decision at step #1180 to determine of this value is carried to "0", that is, to the next higher digit. If this value is "0", it means that the carry has occurred and, therefore, "1" is added to the counter CNTR2 of the higher significant 8 bits at step #1185 and is then set in the register for E$^2$PROM at step #1190 and the address "0" is set in the address register at step #1195, followed by the writing subroutine at step #1200 to effect the writing in E$^2$PROM, after which step #1205 takes place.

If the counter CNTR1 is not "0", no carry is made and, therefore, the program flow proceeds to step #1205 without the higher significant 8 bits being changed and also with no rewriting to E$^2$PROM being carried out.

Then, the microcomputer M examines the content of the counter CNTR2 of the higher significant 8 bits at step #1205 and, if this content is equal to or smaller than 39, the address specifying parameter R1 is rendered to be "1" at step #1210. However, if the content is equal to or smaller than 78 as determined at step #1215, the address specifying parameter R1 is rendered to be "11" at step #1220, but if the content is equal to or smaller than 117 as determined at step #1225, the address specifying parameter R1 is rendered to be "21" at step #1230. However, if the content exceeds 117 as determined at step #1225, the address specifying parameter R1 is rendered to be "31" at step #1235. Thereafter, the data of the lower significant 8 bits and the address R1 are set in the register for E$^2$PROM output, and the writing is effected, followed by the film winding (steps #1245 to #1260).

The subroutine for the film winding is shown in FIG. 16, which subroutine is substantially identical with that shown in FIG. 10 except for the following difference. Specifically, instead of step #773 shown in FIG. 10, a step #1325 for examining the content of the counter CNTR2 of the higher significant 8 bits is employed so that, when this value is equal to or smaller than 156, the program flow can proceed to step #1130 to effect the rewriting of the number of exposures made on the film in E$^2$PROM, but if it is in excess of 156, the program flow can proceed to step #1355 to refrain the writing in E$^2$PROM.

(Third Embodiment)

In the third embodiment which will be described in detail later, the timing at which the cumulative number of releases and the number of exposures made onn the film are written in E$^2$PROM is chosen to be the OFF timing of the second curtain of the focal plane shutter (the start of movement of the second curtain of the shutter). This is because no control of the camera is needed to be effected during a period from the start of movement of the second curtain to the completion of the exposure (completion of the movement of the second curtain) and this spare period is utilized to effect the writing in E$^2$PROM so that the sequence control can be efficiently performed. This is particularly advantageous where the continuous shooting is often carried out. The flowchart suited for this purpose is illustrated in FIGS. 17 and 18.

Figure 17:
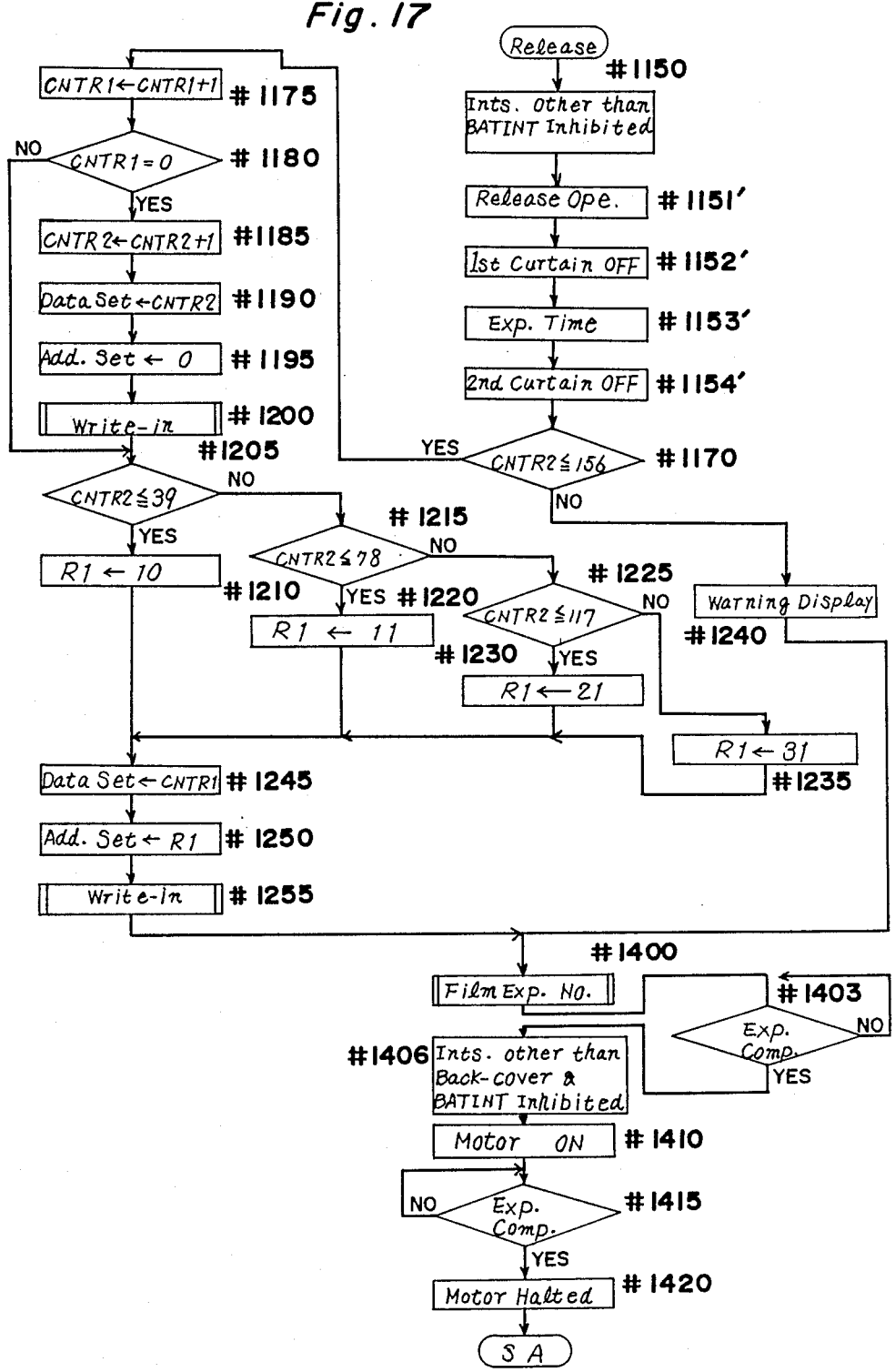
FIG. 17 is a flowchart similar to FIG. 15, showing a shutter release routine of a third embodiment of the present invention.

FIG. 17 is a modified form of the flowchart of FIG. 15. As shown therein, after the microcomputer M has interrupted all interruptions other than BATINT interruption at step #1150, it controls the exposure control circuit AEC to permit a release operation (an operation, such as a mirror-up operation, that continues until the start of exposure) at step #1551' (This can alternatively be achieved by means of a timer control, or by controlling the release operation with the use of a switch for detecting the completion of the mirror up movement.), and the first curtain of the focal plane shutter is subsequently rendered at step #1152' to be OFF (the start of movement of the first curtain). After the passage of an exposure time at step #1153', the second curtain is rendered to be OFF (the start of movement of the second curtain) at step #1154'.

Subsequent to the writing of the cumulative number of releases in E$^2$PROM during the flow from step #1170 to step #1255 (the description of which is herein omitted), the number of exposures made on the film is written in E$^2$PROM at step #1400. Upon the completion of the exposure subsequent to the completion of the movement of the second curtain, the winding control is carried out, followed by the execution of the SA routine (steps #1403, #1046, #1410, #1413 and #1420).

Figure 18:
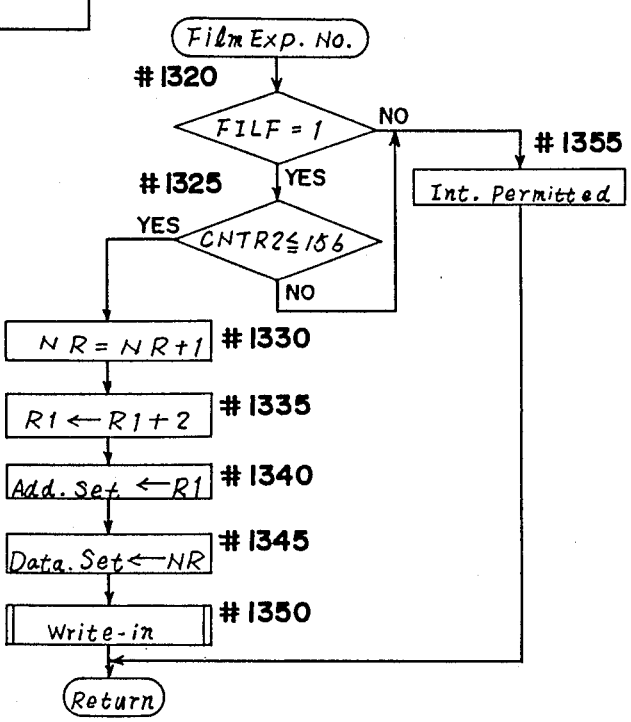
FIG. 18 is a flowchart showing an exposed film number rewriting subroutine of the third embodiment.

A subroutine for rewriting the number of exposures made on the film is illustrated in FIG. 18. The flowchart of FIG. 18 is substantially similar to the flowchart for the updating of the number of exposures available in the film which is shown in FIG. 16, except that the film winding routine (steps #1300 to #1315) is excluded. Because of the similarity, the description of FIG. 18 will not be reiterated for the sake of brevity, since blocks like those of FIG. 16 are designated by like step numbers.

(Fourth Embodiment)

The fourth embodiment of the present invention which will be hereinafter described is so designed that, without carrying out the writing of the cumulative number of releases each time the release has been effected, a certain cumulative number of releases done is taken as a unit and a number of units is written. With this arrangement, the necessity of the spare bytes and the unnecessary consumption of the electric power can be minimized, thereby to shorten the time required to write in E$^2$PROM.

However, in such case, since the cumulative number of releases stored in the register in the microcomputer M will be lost when the battery is removed, the cumulative number of releases which has not yet attained the unit will be cancelled to zero. Therefore, the cumulative number of releases so cancelled will be an error relative to the correct cumulative number of releases, which error will not be so detrimental because the number of replacement of batteries per 10000 times of actual photo-taking may be little. By way of example, assuming that the cumulative number of releases taken as a single unit is 5 and that the number of shootings available with a fresh battery just replaced is 500 exposures (corresponding to about 20 rolls of 24 exposure film), the battery would be replaced 20 times before 10000 shootings is accomplished. Assuming again that the number of releases cancelled at the time of replacement of each battery is 2.5 on an average, the error referred to above would be $20 \times 2.5 = 50$ and corresponds to about 0.5% relative to the 10000 shootings.

The introduction of the number of units in place of the cumulative number of releases requires a minor change in Table 2 in such a way as to delete, from Table 2, the addresses (11), (21) and (31) for the spare bytes of the lower significant 8 bits of the cumulative number of releases, and the memories necessitated therefor.

Figure 20:
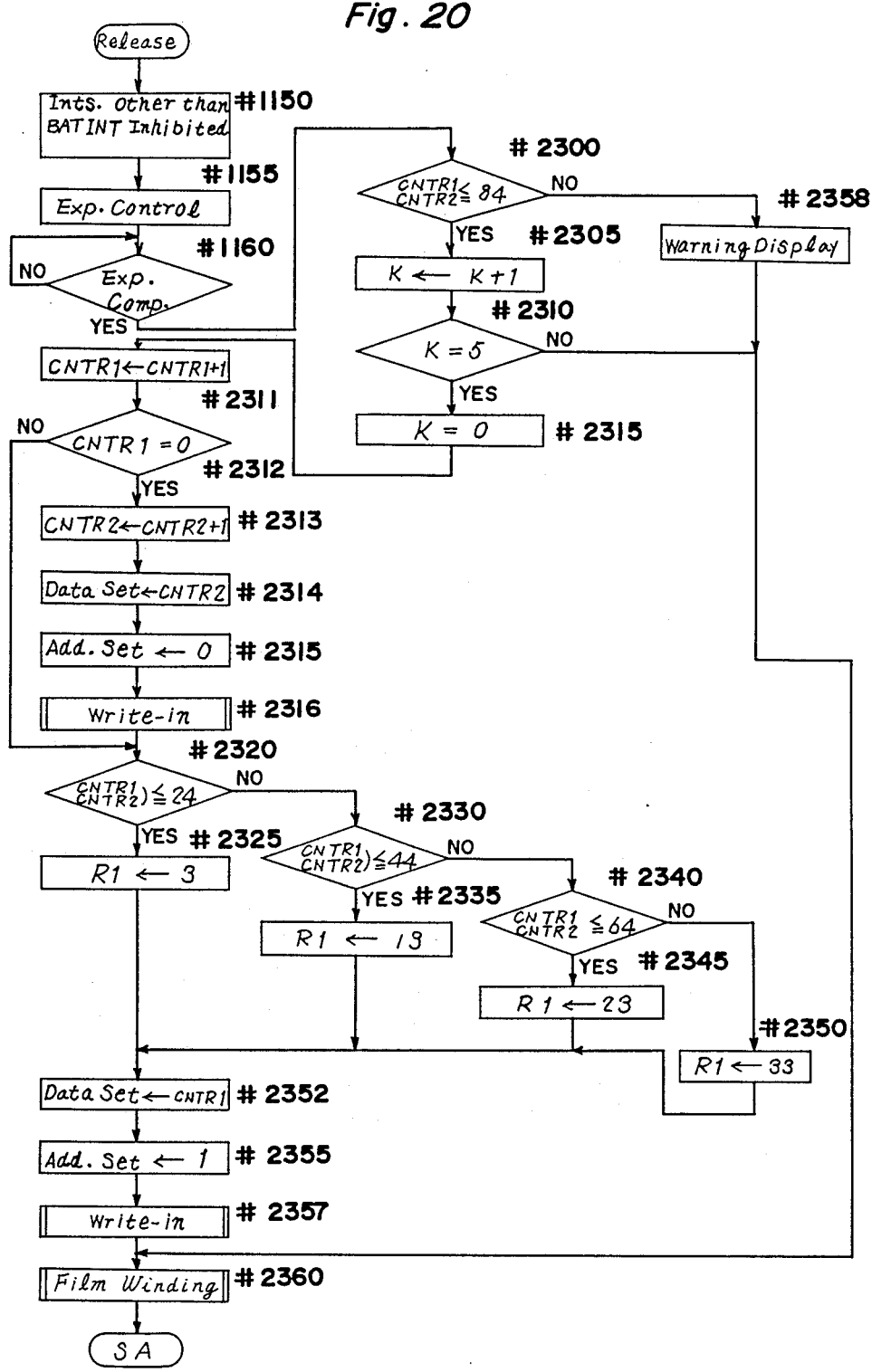
Figures 21, 23:
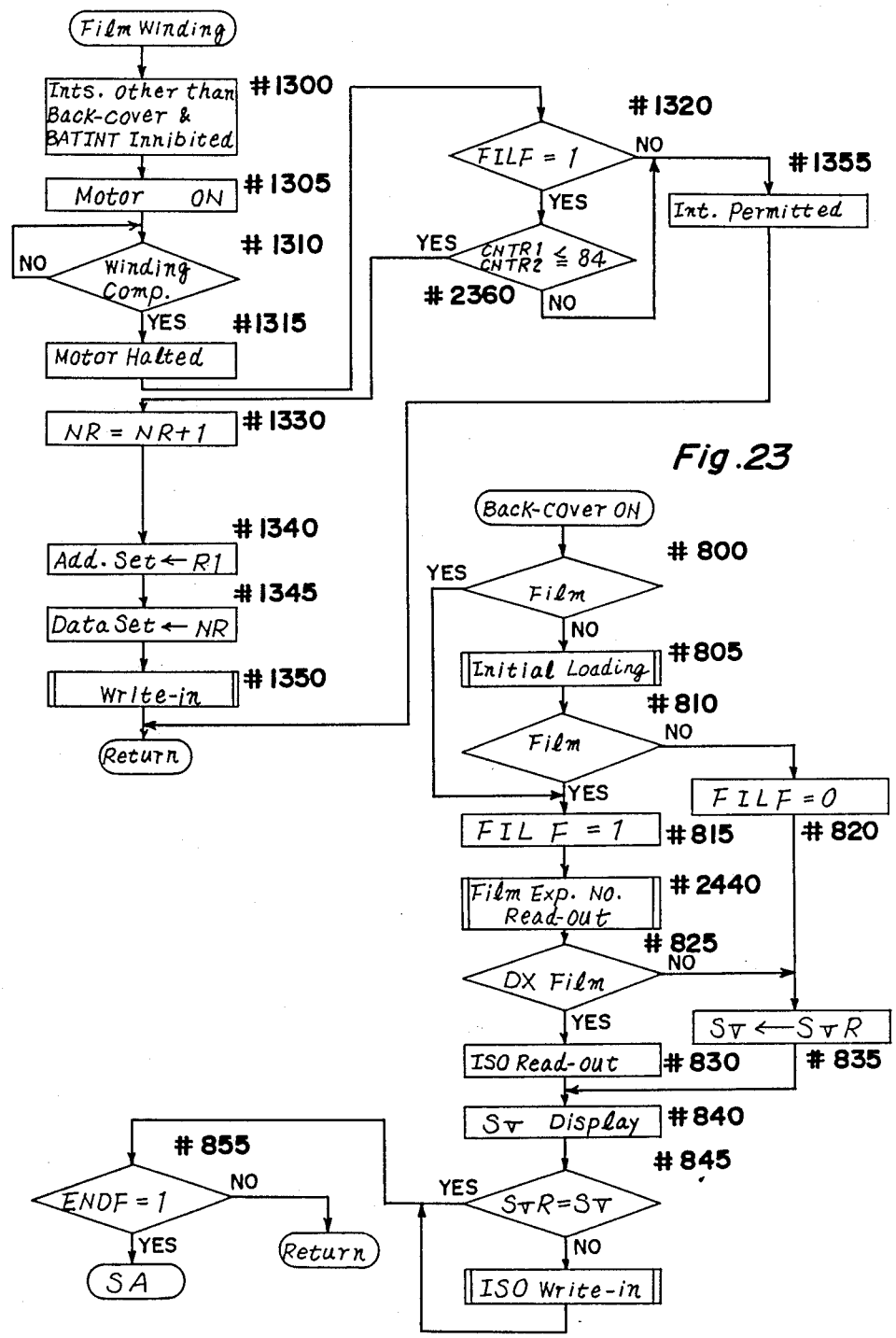

The sequence of operation of the microcomputer M necessary to accomplish the fourth embodiment of the present invention is illustrated in FIGS. 19 to 21 which correspond to FIGS. 14 to 16, respectively, of the second embodiment of the present invention.

Referring first to FIG. 19, the microcomputer M inhibits all of the interruptions at step #2000 and, during the flow from step #2005 to step #2030, data of the higher significant 8 bits and the lower significant 8 bits of the addresses "0" and "1" in E²PROM are read out and then respectively stored in predetermined registers (these registers being hereinafter referred to as counters CNTR2 and CNTR1.

Assuming that a single unit of releases corresponds to 5 consecutive releases, 1000 releases would be indicated when the value of each of the registers (counters CNTR2 and CNTR1) represents 20000.

The microcomputer M decodes the contents of the counters referred to above. If the value thereof is equal to or smaller than 24, it means that the value of the counters is equal to or smaller than 2000 (equal to or smaller than 10000 releases) and the address specifying parameter R1 is set to "3" (the flow from step #2035 to #2040); if the decoded value thereof is equal to or smaller than 44, it means that the value of the counters is equal to or smaller than 4000 (20000 releases) and the address specifying parameter R1 is set to "13" (the flow from step #2045 to step #2050); if the decoded value of the counters is equal to or smaller than 64, it means that the value of the counters is equal to or smaller than 6000 (30000 releases) and the address specifying parameter R1 is set to "23" (the flow from step #2055 to step #2060); and if the decoded value of the counter is equal to or smaller than 84, it means that the value of the counters is equal to or smaller than 8000 (40000 releases), the address specifying parameter R1 is set to "33" (step #2085). Thereafter, the data DA (the number of available exposures on the film) of E²PROM is read out at step #2090 and stored in a predetermined register R2 at step #2095, followed by step #2100. Should the contents of the counters exceed 8000 (40000 releases), data for the display of a warning is outputted to the display unit at step #2097, and the program flow proceeds to step #2100. Then, the microcomputer M sets the address to "4" at step #2100 and reads data from E²PROM at step #2105, followed by the storage of the data at a predetermined register at step #2110. Subsequent to step #2110, a parameter K for the counting of the number of the units is set to "0" at step #2115 and the interruption is then permitted at step #2220, followed by the return of the program flow.

The flowchart shown in FIG. 20 is similar to that of FIG. 15 except for the difference residing in that step #1170 shown in FIG. 15 is changed to step #2300 in FIG. 20 while three steps used to determined if the number of releases has attained a single unit are added to the flowchart of FIG. 20, in that steps #1205 to #1235 in the flowchart of FIG. 15 are changed to steps #2320 to #2350 in FIG. 20, and in that step #1250 in the flowchart of FIG. 15 is changed to step #2355 in FIG. 20. These differences will now be described sequentially. Since in the fourth embodiment a single writing is carried out each time the number of releases counts to five, a decision is made to determine if the content of the counter is equal to or smaller than 8000 (40000 releases) and, if it exceeds 8000, a warning display is effected at step #2358. If it does not exceed 8000, the parameter K is added with 1 to provide a new parameter K at step #2305, followed by a decision at step #2310 to determine if the parameter K becomes 5. If the parameter K is smaller than 5, no writing in E²PROM takes place and the program flow proceeds to the film winding subroutine at step #2360 to effect the film winding operation. However, if the parameter K attains 5, this is set to "0" at step #2351, followed by the writing in E²PROM at steps #2311 to #2316.

Since, as hereinbefore described, the writing is carried out each time the cumulative number of releases attains 5, instead of the content of the counters for a unit of 10000 releases in the previous embodiment, the address specifying parameter R1 is set to "3" (the flow from step #2330 to step #2335) if the decoded value of the counters CNTR1 and CNTR2 is equal to or smaller than 24; the address specifying parameter R1 is set to 13 (the flow from step #2330 to step #2335) if the decoded value of the counters CNTR1 and CNTR2 is equal to or smaller than 44; the address specifying parameter R1 is set to 23 (the flow from step #2340 to step #2345) if the decoded value of the counters CNTR1 and CNTR2 is equal to or smaller than 64; and the address specifying parameter R1 is set to 33 if the decoded value of the counters CNTR1 and CNTR2 exceeds 64. It is to be noted that this address specifying parameter R1 represents an address of E²PROM for the number of exposures made on the film. After the setting of the address specifying parameter, a data of the lower significant 8 bit counter CNTR1 is set at step #2352, the address is set to "1" at step #2355, and the data so set is written in E²PROM at step #2357, followed by the execution of the film winding subroutine at step #2360.

The flowchart shown in FIG. 21 is similar to that shown in FIG. 16 from which step #1335 for the setting of a value for the address is omitted and in which step #1325 is changed to step #2360. This modification of the flowchart of FIG. 16 is necessitated because in the fourth embodiment, the writing is effected each time the cumulative number of releases attains five. Since the other flow steps in the flowchart of FIG. 21 are similar to those shown in FIG. 16, the description thereof will not be reiterated for the sake of brevity.

(Fifth Embodiment)

In the fifth embodiment of the present invention which follows, the number of exposures available for a particular film is utilized to count the cumulative number of releases. More specifically, when the film is loaded, the number of exposures available for the film is read from an electrically presented code pattern and is normalized to represent the cumulative number of releases. The number of exposures available for the film used for the normalization of the cumulative number of releases is selected to be 12 and, therefore, a single unit is taken for each 12 releases so that 1 can be added to the counter. In other words, in the fifth embodiment of the present invention, the number of exposures available for a particular film is used in place of the cumulative number of releases without the latter not being actually counted and, also, in place of the five releases constituting the single unit in the previous embodiment, 12 releases are used to constitute a single unit.

Accordingly, 10000 releases corresponds to a count value of 833 (the actual cumulative number of releases being 9996); 20000 releases corresponds to a count value of 1666 (the actual cumulative number of releases being 19992); 30000 releases corresponds to a count value of 2499 (the actual cumulative number of releases being 29988); and 40000 releases corresponds to a count value of 3332 (the actual cumulative number of releases being 39984). It is, however, to be noted that, while 30000 releases will result in the count value of 2500, if 2500 is employed, the difference between the actual cumulative number of releases for 30000 counts and that for 200000 counts is 10008 which exceeds 10000 and, therefore, it is not employed in the practice of the present invention.

The flowcharts for accomplishing the fifth embodiment of the present invention are shown in FIGS. 22 to 25.

Figure 22:
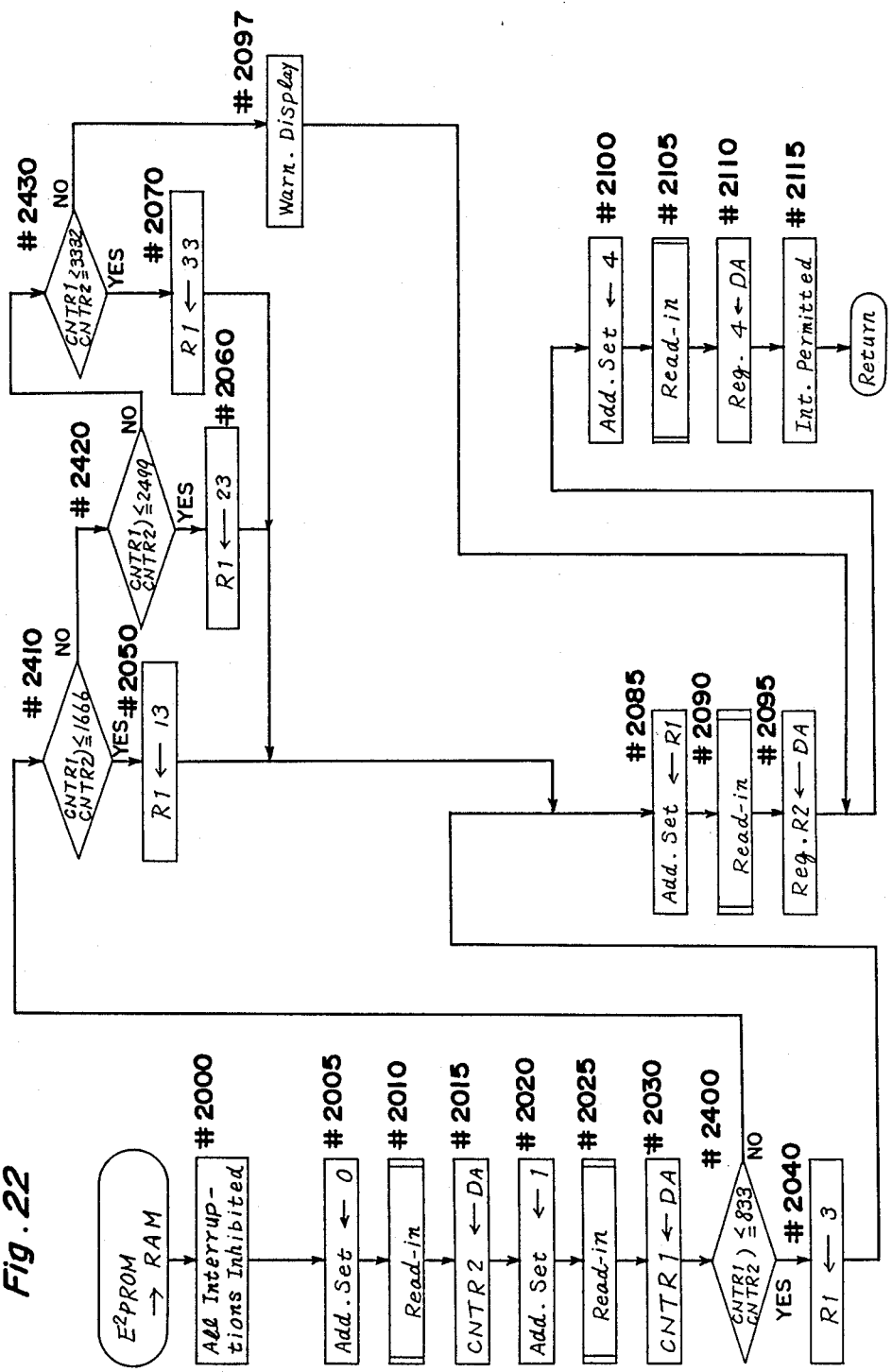
Figure 24:
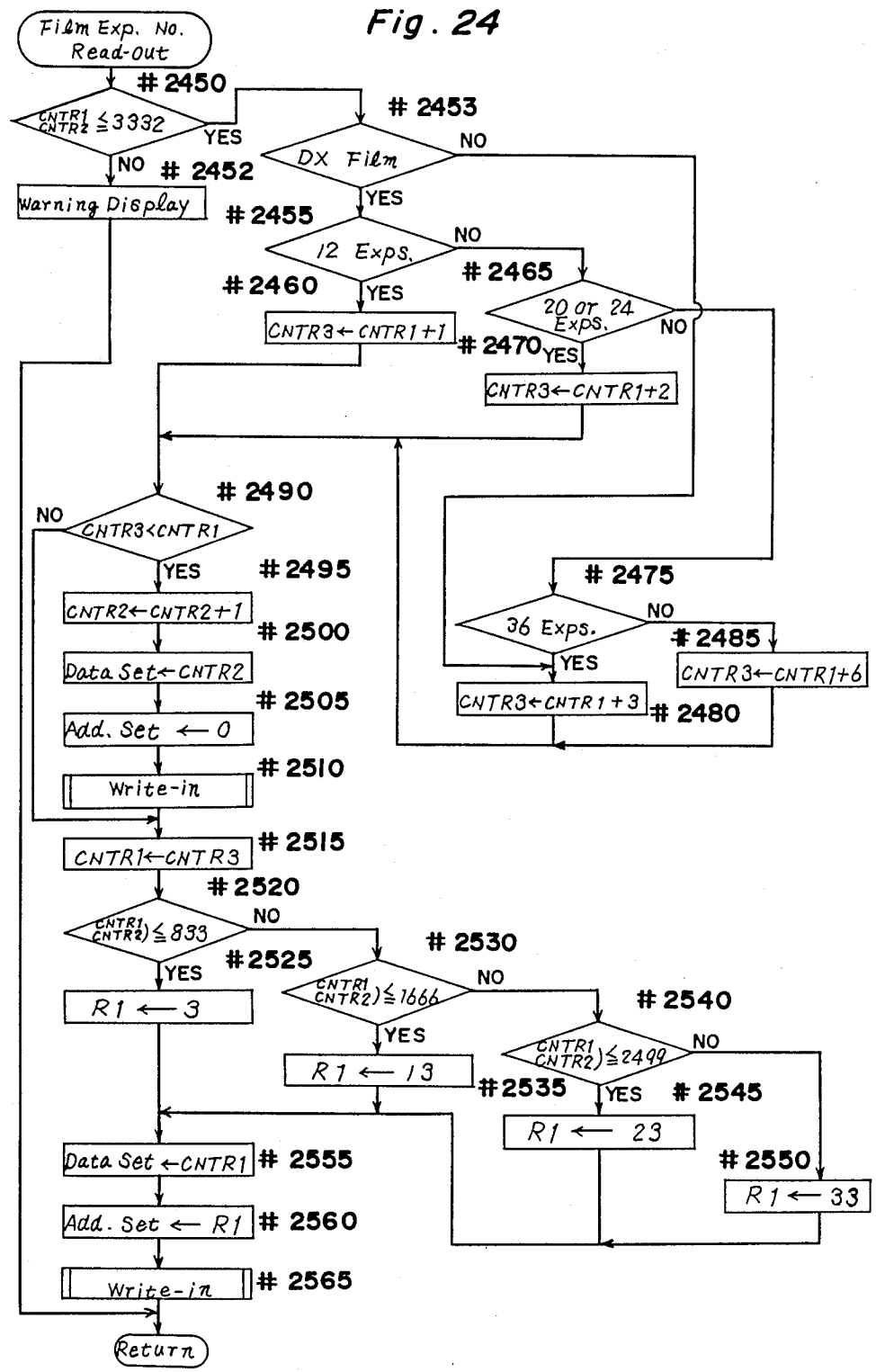
FIG. 24 is a flowchart showing a film number writing subroutine of the fifth embodiment.

The flowchart shown in FIG. 22 corresponds to that shown in FIG. 19. However, because of the difference in the unit used for the normalization of the number of rewriting, the values shown in respective steps #2035, #2045, #2055 and #2065 in the flowchart of FIG. 19 are changed to the above mentioned count values as shown in respective steps #2400, #2410, #2420 and #2430 in the flowchart of FIG. 22. Except for these differences, the flowchart of FIG. 22 is similar to that of FIG. 19 and, therefore, the description thereof will not be reiterated for the sake of brevity. It is, however, to be noted that the resetting of the parameter K at step #2115 in the flowchart of FIG. 19 is not necessary in the practice of the fifth embodiment of the present invention and is, therefore, omitted.

In such case, the reading of the number of exposures available for a particular film may be executed during the execution of the back-cover closure subroutine (FIG. 11) that is executed when the back cover is closed subsequent to the loading of the film. The flowchart shown in FIG. 23 is substantially similar to the flowchart of Fig. 11 to which a subroutine (step #2440) for the reading of the number of available exposures is added and, accordingly, the description thereof will not be reiterated for the sake of brevity. To describe the subroutine with reference to FIG. 24, the microcomputer M makes a decision at step #2450 to determine of the count value is equal to or smaller than 3332 (40000 releases) and, if it exceeds 3332, a data for the display of a warning is outputted at step #2452 to the display unit without the contents of the counter CNTR1 and CNTR2 being rewritten, followed by the return of the program flow.

Should the value of the counters be equal to or smaller than 3332, a decision is made at step #2453 to determine if the film is a DX film, and, if it is not the DX film, step #2480 takes place to set the number of available exposures of the film that is most widely used. Since the film that is most widely used is a 36 exposure film, the number of available exposures is presumed to be 36 and, therefore, "3" is added to the counter CNTR1. However, the flow may be so designed that the number of available exposures is rendered to be 24, followed by a program skip to step #2470 at which "2" is added to the counter, or that by averaging the both, the count value may be selected to be 2.5. (However, in the latter case, it is necessary that a design be made so that the count including a decimal point can be accomplished.)

In the event of the DX film, respective decisions are successively made at steps #2455, #2465 and #2475 to determine if the film is a 12 exposure film, a 20 or 24 exposure film, a 26 exposure film and a 72 exposure film. Should the result of each of the decisions at steps #2455, #2465 and #2475 indicate "yes" , "1", "2", "3" or "6" is added to the contents of the counter CNTR1 of the lower significant 8 bits at a respective step #2460, #2470, #2480 or #2485 for the setting in a different counter CNTR3, followed by step #2490.

At step #2490, the count values of the respective counters CNTR3 and CNTR1 are compared with each other. If the count value of the counter CNTR3 is smaller than that of the counter CNTR1, it means that a carry is effected and a data of the counter CNTR1 of the higher significant 8 bits to which 1 is added and its address "0" are respectively set in output registers, after which the writing subroutine is executed to write in E²PROM, followed by step #2515 (the flow from step #2495 to step #2510). On the other hand, if the value of the counter CNTR3 is equal to or greater than that of the counter CNTR1, the program flow proceeds to step #2515 without the writing of the higher significant 8 bits being performed, at which the content of the counter CNTR3 is transferred onto the counter CNTR1.

The microcomputer M performs the following processes according to the count value of each of the counters CNTR1 and CNTR2. More specifically, if the count value is equal to or smaller than 883, the address specifying parameter R1 is set to 3 (the flow from step 3#2520 to #2525); if it is equal to or smaller than 1666, the address specifying parameter R1 is set to 13 (the flow from step #2530 to step #2535); if it is equal to or smaller than 2499, the address specifying parameter R1 is set to 23 (the flow from step #2540 to step #2545); and if it exceeds 2499, the address specifying parameter R1 is set to 33 (the flow from step #2540 to step #2550). Thereafter, the data of the lower significant 8 bits and the address specifying parameter R1 are respectively set in the output registers for E²PROM at respective steps #2555 and #2560, followed by the execution of the writing subroutine at step #2565 to effect the writing in E²PROM before the program flow returns.

Figure 25:
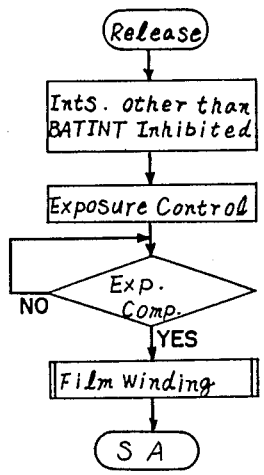
FIG. 25 is a flowchart showing a routine executed at the time of the shutter release of the fifth embodiment.
Figure 26:
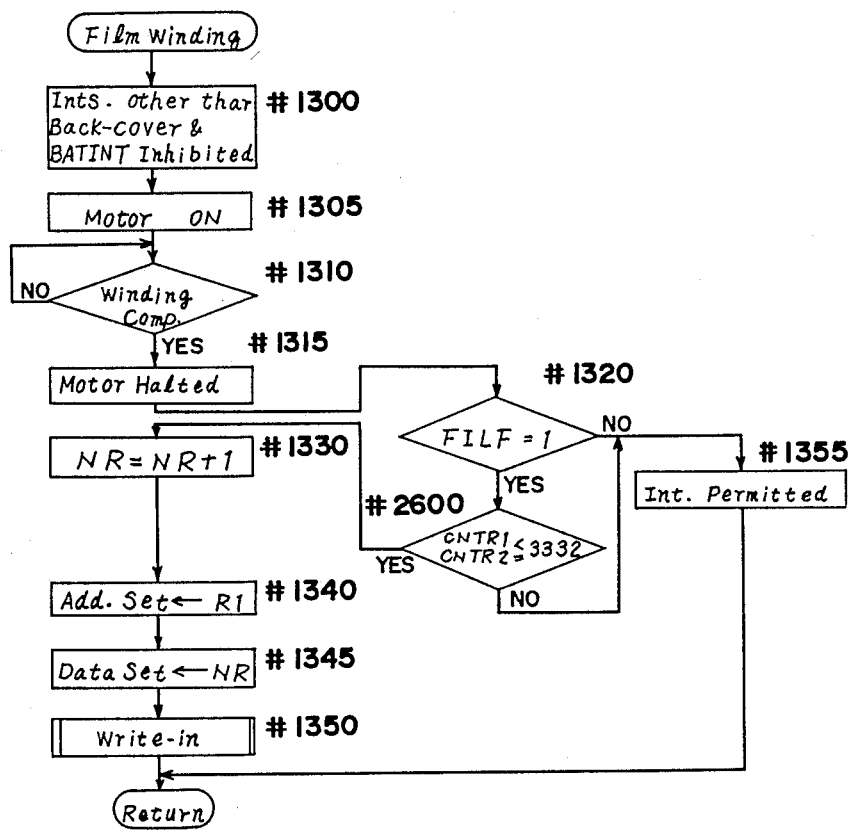
FIG. 26 is a flowchart showing a subroutine for the film wind-up operation of the fifth embodiment.

Additional differences from the fourth embodiment of the present invention reside in that the necessity of writing the cumulative number of releases has been obviated and in that the cumulative number of releases is normalized with the number of exposures available for the film. Specifically, the first mentioned additional differences lies in that, as shown in the flowchart of FIG. 25, steps #2300 to #2358 shown in FIG. 20 have been obviated. The second mentioned additional differences lies in that, in step #2600 which corresponds to step #2360 shown in FIG. 21, a designation (CNTR2),(CNTR1)≦3332 is employed.

A modification accomplished by modifying a portion of the fifth embodiment of the present invention will now be described. In this modification, the number of exposures made on the film is displayed as zero and, at the same time, the value zero is rewritten in E²PROM in the event that the back cover is opened with the film wound onto the spool and the film is subsequently removed.

Figure 27:
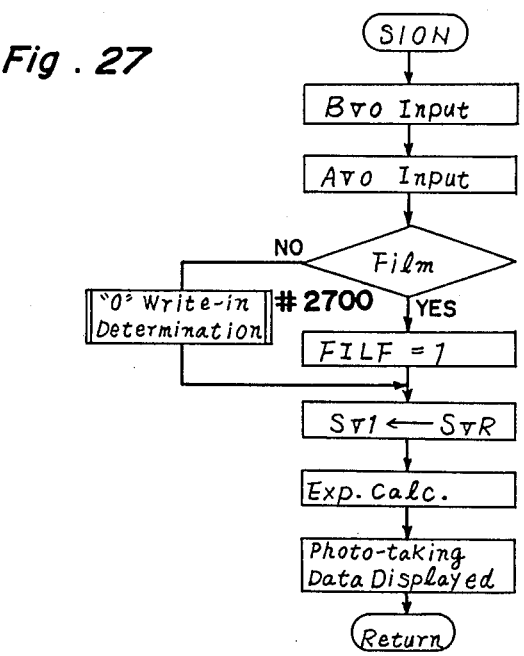
FIG. 27 is a flowchart showing a subroutine for S1ON of a sixth embodiment of the present invention.
Figure 28:
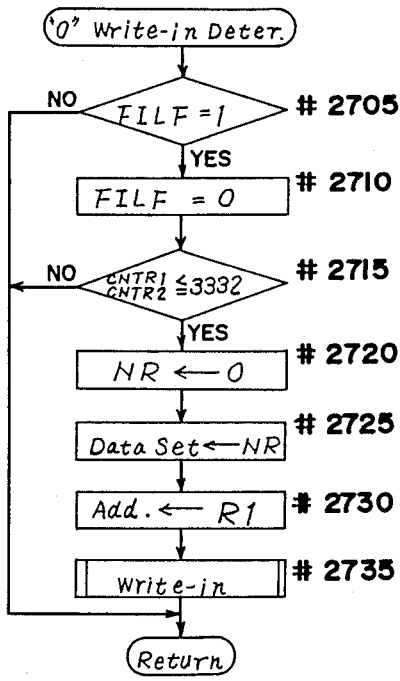
FIG. 28 is a flowchart showing a "0" write-in determining routine of the sixth embodiment.

The flowchart necessary to accomplish this modification is shown in FIGS. 27 and 28. FIG. 27 represents a modified form of the S1ON interruption routine shown in FIG. 7, in which in place of step #470 shown in FIG. 7, a subroutine (step #2700) is provided for making a decision to determine if the "0" writing is to be performed. This subroutine is shown in detail in FIG. 28.

Referring to FIG. 28, the microcomputer M makes a decision at step #2705 to determine if a flag FILF indicative of the presence or absence of the film is set. If the flag FILF is set, it means that, while the film had been present during the previous execution of this flow, the film is currently absent, that is, it means that the film has been removed on the way and, therefore, the flow for the "0" writing is executed. For this purpose, the flag is reset at step #2710, followed by a decision at step #2715 to determine if the count value of the counters CNTR2 and CNTR1 for the cumulative number of releases is equal to or smaller than 3332 (about 40000 releases). If the count value is equal to or smaller than 3332, a parameter NR for the number of exposures made on the film is rendered to be zero at step #2720; this data NR and the address specifying parameter R1 are respectively set as the output data and the address register for the E²PROM at respective steps #2725 and #2730; and the writing subroutine is executed at step #2735 to write this data "0". In this way, even when the film is removed, not only is this displayed during the execution of the subsequent flow steps, but also the writing is made to the E²PROM and, therefore, even when the battery is removed for the replacement with a fresh one, the correct number of exposures made on the film can be displayed.

In FIG. 28, should the flag not be set at step #2705, or when the rewriting is carried over a predetermined number of times, the program flow returns without the rewriting being effected.

In describing the numerous embodiments of the present invention including some modifications thereof, the permissible number of rewriting in E²PROM has been described as 10000 and this is a limit of the existing E²PROM. However, with the progress of technology, this limit may vary and, in such case, the present invention can be applicable, provided that the permissible rewriting number be correspondingly modified.

While the cumulative number of releases has been described as countable up to 40000 releases, it may not always be limited thereto, but may be greater or smaller than 40000 releases.

Also, if the shutter release is effected simultaneously with the film winding operation during the initial loading, this may be counted as a shutter release.

Furthermore, in the embodiments and the modifications, the number of rewriting of the number of exposures made on the film may be counted and, in such case, the number of rewriting of the exposures made on the film can be correctly detected. For this purpose, it is recommended to count this number with the use of the microcomputer M, to provide a 2-byte (countable up to 10000 releases) memory for the storage of the counter value each time the rewriting is performed, and spare memories in E²PROM.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A data rewriting apparatus for a photographic camera, which comprises:
   a first manipulating means for selectively setting the camera in a first mode in which change of the film speed is permitted and a second mode in which the change of the film speed is inhibited;
   a mode discriminating means for discriminating which one of the first and second modes is set by the first manipulating means;
   a first storage means including a random access memory for the storage of the film speed;
   a second manipulating means mutually operable for the change of the film speed;
   a changing means for changing the film speed when the second manipulating means is operated so long as the mode discriminating means discriminates that the camera is set in the first mode;
   a first rewriting means for rewriting a value stored in the first storage means to the film speed changed by the changing means;
   a second storage means including an electrically erasable and programmable read only memory for the storage of the film speed; and
   a second rewriting means for rewriting a value stored in the second storage means to a value stored in the first storage means when the change from the first mode to the second mode has been discriminated by the mode discriminating means.

2. The apparatus as claimed in claim 1, further comprising a comparing means for comparing the value stored in the second storage means with that stored in the first storage means when the change from the first mode to the second mode has been discriminated by the mode discriminating means, and a rewrite inhibiting means for inhibiting the rewriting of the second rewriting means when the comparing means indicates that the value stored in the second storage means is identical with that stored in the first storage means.

3. A data rewriting apparatus for a photographic camera, which comprises:
   a first manipulating means for selectively setting the camera in a first mode in which change of the photo-taking data is permitted and a second mode in which the change of the photo-taking data is inhibited;
   a mode discriminating means for discriminating which one of the first and second modes is set by the first manipulating means;
   a first storage means including a random access memory for the storage of the photo-taking data;
   a second manipulating means manually operable for the change of the photo-taking data;

a changing means for changing the photo-taking data when the second manipulating means is operated so long as the mode discriminating means discriminates that the camera is set in the first mode;

a first rewriting means for rewriting a value stored in the first storage means to the photo-taking data changed by the changing means;

a second storage means including an electrically erasable and programmable read only memory for the storage of the photo-taking data; and a second rewriting means for rewriting a value stored in the second storage means to a value stored in the first storage means when the change from the first mode to the second mode has been discriminated by the mode discriminating means.

4. The apparatus as claimed in claim 3, further comprising a comparing means for comparing the value stored in the second storage means with that stored in the first storage means when the change from the first mode to the second mode has been discriminated by the mode discriminating means, and a rewrite inhibiting means for inhibiting the rewriting of the second rewriting means when the comparing means indicates that the value stored in the second storage means is identical with that stored in the first storage means.

* * * * *